US006704741B1

(12) United States Patent
Lively, Jr. et al.

(10) Patent No.: US 6,704,741 B1
(45) Date of Patent: Mar. 9, 2004

(54) TEST ITEM CREATION AND MANIPULATION SYSTEM AND METHOD

(75) Inventors: Dean Edward Lively, Jr., San Antonio, TX (US); Steven Anthony Ethofer, Atlantic, IA (US)

(73) Assignee: The Psychological Corporation, San Antonio, TX (US)

(*) Notice: Subject to any disclaimer, the term of this patent is extended or adjusted under 35 U.S.C. 154(b) by 293 days.

(21) Appl. No.: 09/705,151

(22) Filed: Nov. 2, 2000

(51) Int. Cl.[7] ............................ G06F 17/00; G06F 7/00
(52) U.S. Cl. ..................................... 707/102; 707/104.1
(58) Field of Search .......................... 707/3, 102, 104.1; 434/322, 353, 350

(56) References Cited

U.S. PATENT DOCUMENTS

| | | | | |
|---|---|---|---|---|
| 4,803,643 | A | 2/1989 | Hickey | 715/513 |
| 5,059,127 | A | 10/1991 | Lewis et al. | 434/353 |
| 5,142,662 | A | 8/1992 | Gump et al. | 715/501.1 |
| 5,211,563 | A | 5/1993 | Haga et al. | 434/322 |
| 5,274,749 | A | 12/1993 | Evans | 706/55 |
| 5,310,349 | A | 5/1994 | Daniels et al. | 434/350 |
| 5,333,310 | A | 7/1994 | Sakai | 707/8 |
| 5,355,472 | A | 10/1994 | Lewis | 707/101 |
| 5,437,554 | A | 8/1995 | Clark et al. | 434/322 |
| 5,557,722 | A | 9/1996 | DeRose et al. | 715/513 |
| 5,597,312 | A | 1/1997 | Bloom et al. | 434/362 |

(List continued on next page.)

OTHER PUBLICATIONS

Master Computer Systems, http://www.mastercomputersys.com/solpro.htm , two pages. Jan. 14, 2000.

(List continued on next page.)

*Primary Examiner*—Greta Robinson
*Assistant Examiner*—Susan Rayyan
(74) *Attorney, Agent, or Firm*—Allen, Dyer, Doppelt, Milbrath & Gilchrist, P.A.

(57) ABSTRACT

A method for creating a test for administration to a student includes creating a plurality of test items using a unitary software application. Each test item has a plurality of elements, including an item stem (a question or problem), at least one option (such as a choice of answers, including one correct answer and at least one “distractor” or an open-ended question), and metadata related to the test item. Next, if desired, an image is added to the test item using the software. Each test item is then stored in an electronic database. Access to each test item in the database is provided, wherein the test items are searchable by at least one of the test item elements. The test creator then electronically selects at least one test item from the database and views at least a portion of the selected test item. If desired, the at least one selected test item is assembled into a test.

11 Claims, 40 Drawing Sheets

U.S. PATENT DOCUMENTS

| | | | | | |
|---|---|---|---|---|---|
| 5,603,025 | A | | 2/1997 | Tabb et al. | 707/2 |
| 5,632,022 | A | | 5/1997 | Warren et al. | 345/776 |
| 5,642,502 | A | | 6/1997 | Driscoll | 707/5 |
| 5,672,060 | A | | 9/1997 | Poor | 434/322 |
| 5,675,788 | A | | 10/1997 | Husick et al. | 707/104.1 |
| 5,684,984 | A | | 11/1997 | Jones et al. | 707/10 |
| 5,694,594 | A | | 12/1997 | Chang | 707/6 |
| 5,696,905 | A | | 12/1997 | Reimer et al. | 705/27 |
| 5,724,595 | A | | 3/1998 | Gentner | 715/501.1 |
| 5,727,156 | A | | 3/1998 | Herr-Hoyman et al. | 709/219 |
| 5,729,751 | A | | 3/1998 | Schoolcraft | 715/530 |
| 5,749,736 | A | | 5/1998 | Griswold et al. | 434/322 |
| 5,775,918 | A | | 7/1998 | Yanagida et al. | 434/353 |
| 5,827,070 | A | | 10/1998 | Kershaw et al. | 434/322 |
| 5,870,731 | A | | 2/1999 | Trif et al. | 706/52 |
| 5,879,165 | A | * | 3/1999 | Brunkow et al. | 434/322 |
| 5,890,911 | A | | 4/1999 | Griswold et al. | 434/322 |
| 5,934,909 | A | * | 8/1999 | Ho et al. | 434/362 |
| 5,954,516 | A | | 9/1999 | Heinberg | 434/322 |
| 5,991,595 | A | | 11/1999 | Romano et al. | 434/353 |
| 6,000,945 | A | | 12/1999 | Sanchez-Lazer et al. | 434/322 |
| 6,018,617 | A | | 1/2000 | Sweitzer et al. | 358/1.15 |
| 6,052,512 | A | | 4/2000 | Peterson et al. | 704/220 |
| 6,149,441 | A | | 11/2000 | Pellegrino et al. | 434/350 |
| 6,234,806 | B1 | * | 5/2001 | Trenholm et al. | 434/322 |
| 6,256,399 | B1 | | 7/2001 | Poor | 382/100 |
| 6,259,890 | B1 | * | 7/2001 | Driscoll et al. | 434/350 |
| 6,315,572 | B1 | | 11/2001 | Owens et al. | 434/322 |
| 6,431,875 | B1 | * | 8/2002 | Elliott et al. | 434/322 |
| 6,442,370 | B1 | * | 8/2002 | Driscoll et al. | 434/350 |

OTHER PUBLICATIONS

Test Bulder, http://www.kiva.net/~fulton/TB/home.htm , three pages. Jan. 14, 2000.

Microcat Computerized Testing System, six pages. No publication date.

Microcat Computerized Testing Systems, http://assess.com/microcat.html , four pages. Jan. 14, 2000.

Cat Builder, brochure, two pages. Dec. 1999.

Cat Software System & Trade, http://www.catinc.com/softwarespecs.htm , three pages Jan. 14, 2000.

Pilot Software, http://www.pilotltd.com/contact.htm , one page. Jan. 14, 2000.

Pilot Software, http://www.pilotltd.com/products.htm , three pages. Jan. 14, 2000.

CTB Online, http://www.ctb.com/contact/index.html , one page. Jan. 14, 2000.

Riverside Publishing, http://www.riverpub.com/feedback.html , one page. Jan. 14, 2000.

Riverside Publishing, http://www.riverpub.com/products.htm , one page. Jan. 14, 2000.

Bookette's Curriculum Director 3.0 Versus Harcourt's Custom Item Bank Developed in File Maker Pro V.5.0, one page. No publication date.

* cited by examiner

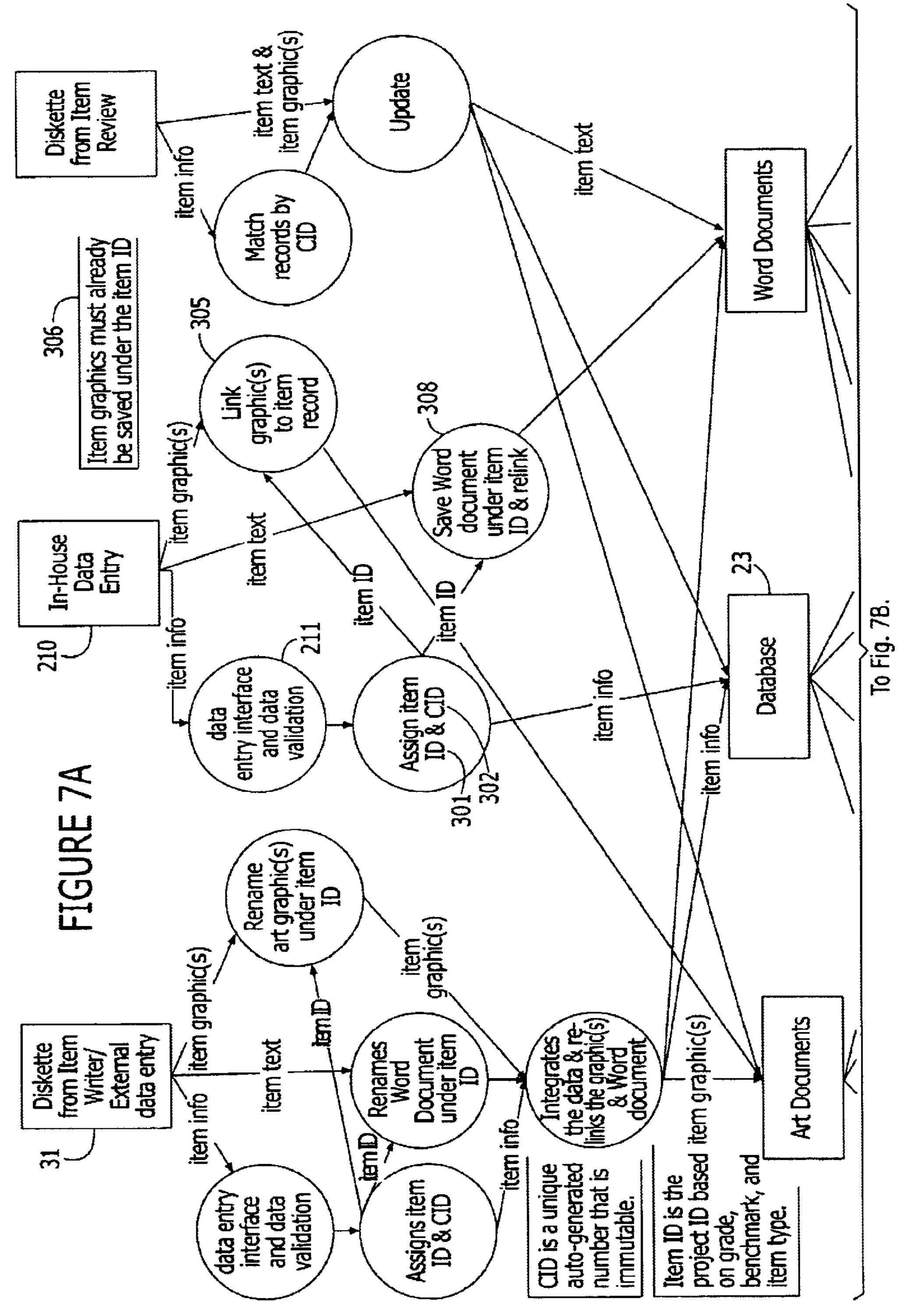

FIGURE 7A
Diskette from Item Writer/ External data entry
31
item info
item text
item graphic(s)
data entry interface and data validation
Assigns item ID & CID
item ID
Renames Word Document under item ID
Rename art graphic(s) under item ID
item graphic(s)
Integrates the data & re-links the graphic(s) & Word document
CID is a unique auto-generated number that is immutable.
Item ID is the project ID based on grade, benchmark, and item type.
In-House Data Entry
210
data entry interface and data validation
211
Assign item ID & CID
301
302
Link graphic(s) to item record
305
Save Word document under item ID & relink
308
Item graphics must already be saved under the item ID
306
Diskette from Item Review
Match records by CID
Update
item text & item graphic(s)
Word Documents
Database
23
Art Documents
To Fig. 7B.

| Item Writer Code: 078 | Grade: 9 |
|---|---|
| Content Source: - KJLKJ;LSKDJ | Passage Title: |
| Item Type: M | Reporting Categories: Data Analysis and Probability |
| Cognitive Level: 1 | Passage Topics: |
| Estimated Difficulty: E | Sunshine Standard Topic: Social Studies |
| Benchmark: E111 | Art ID: |
| Item Sequence No 0008 | Passage Code: |
| Item ID: 09MAE111M0008 | |

Which of the following numbers equals a one out of two chance?

(A) .5
(B) .3 [wrong number]
(C) .4 [wrong number]
(D) .2 [wrong number]

Correct Responses: A Item Accepted? ☑ Yes ☐ No

Gridded Response:

FIGURE 8

Initial IDEA

File Edit Record Info

Item Number Initial ID

FCAT Data Entry

Initial ID 4212000061914562600002

215'

Item Number 000002

Item Writer Code 421

Grade 7

Domain LA

Benchmark A132

Item Type M

Cog Lvl

Est Diff

Number of Graphics 0

Lead Art ID Description

234a

Option Art ID Description

234b

Rpt Category

SSS Topic Health & Physical Education

Content Focus

Content Source

Passage Title

Passage Code

Passage Seq No 000

Passage Topics

Gridded Rsp

MC Correct Opt B

What European country first established a permanent presence in St. Augustine, Florida?

235

(A) Spain (B) France (C) England (D) Portugal

236

232

233

Onli

Start | Microsoft Word-InitialIDE... | Initial IDEA | Inbox - Microsoft Outlook

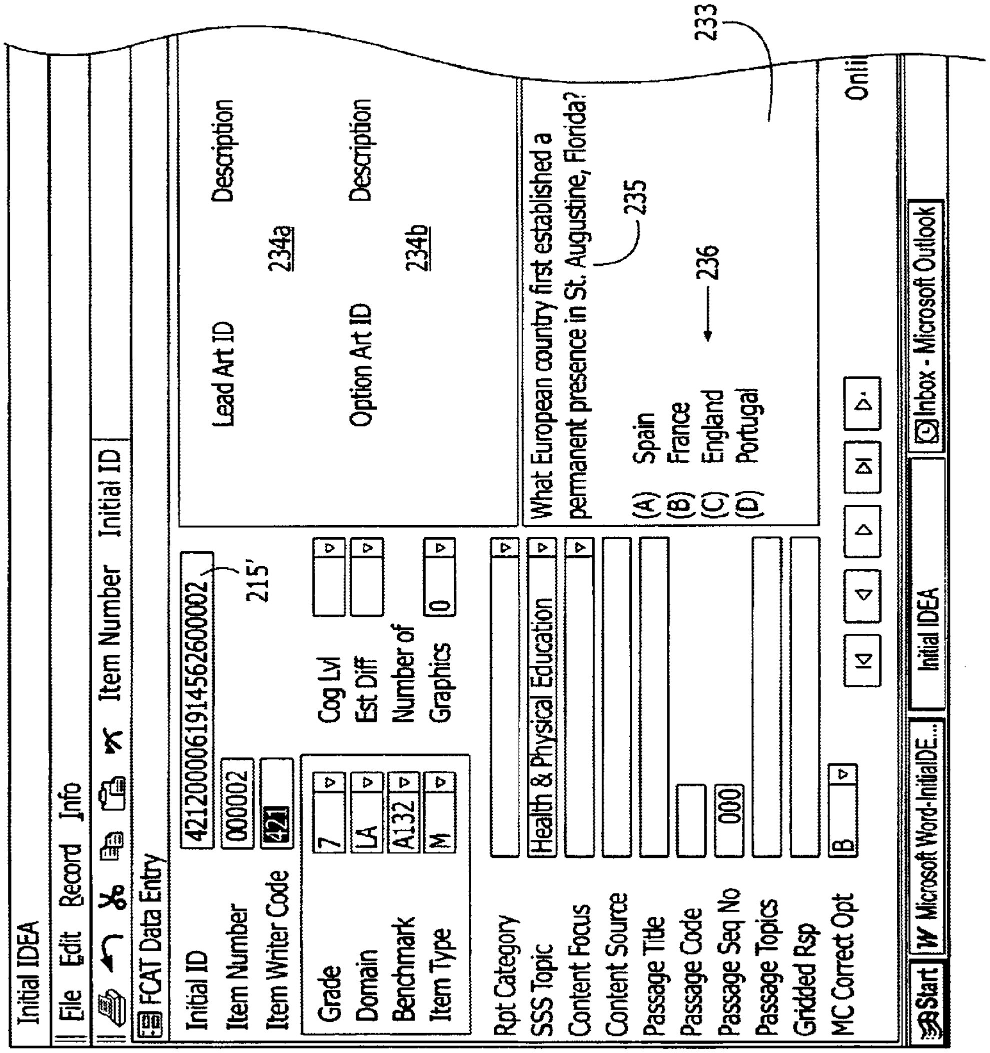

FIGURE 11

Initial IDEA

File Edit Record Help

FCAT Item Review

421ZX

215"

0000

Grade 7

Domain LA

Benchmark A238

Item Type M

Cog Lvl 1

Est Diff

Number of Graphics 0

Lead Art ID Description

236a

Option Art ID Description

236b

Rpt Category Informational Text

SSS Topic Social Studies

Content Focus

Content Source

Passage Title ST. AUGUSTINE

Passage Code ST AUG

Passage Seq No

Passage Topics

Gridded Rsp

Gr Rsp Rationale

MC Correct Opt B

What European country first established a permanent presence in St. Augustine, Florida?

(A) Spain
(B) France
(C) England
(D) Portugal

237

Onli

Start | Microsoft Word-InitialDE... | Revised IDEA | Inbox - Microsoft Outlook

214'

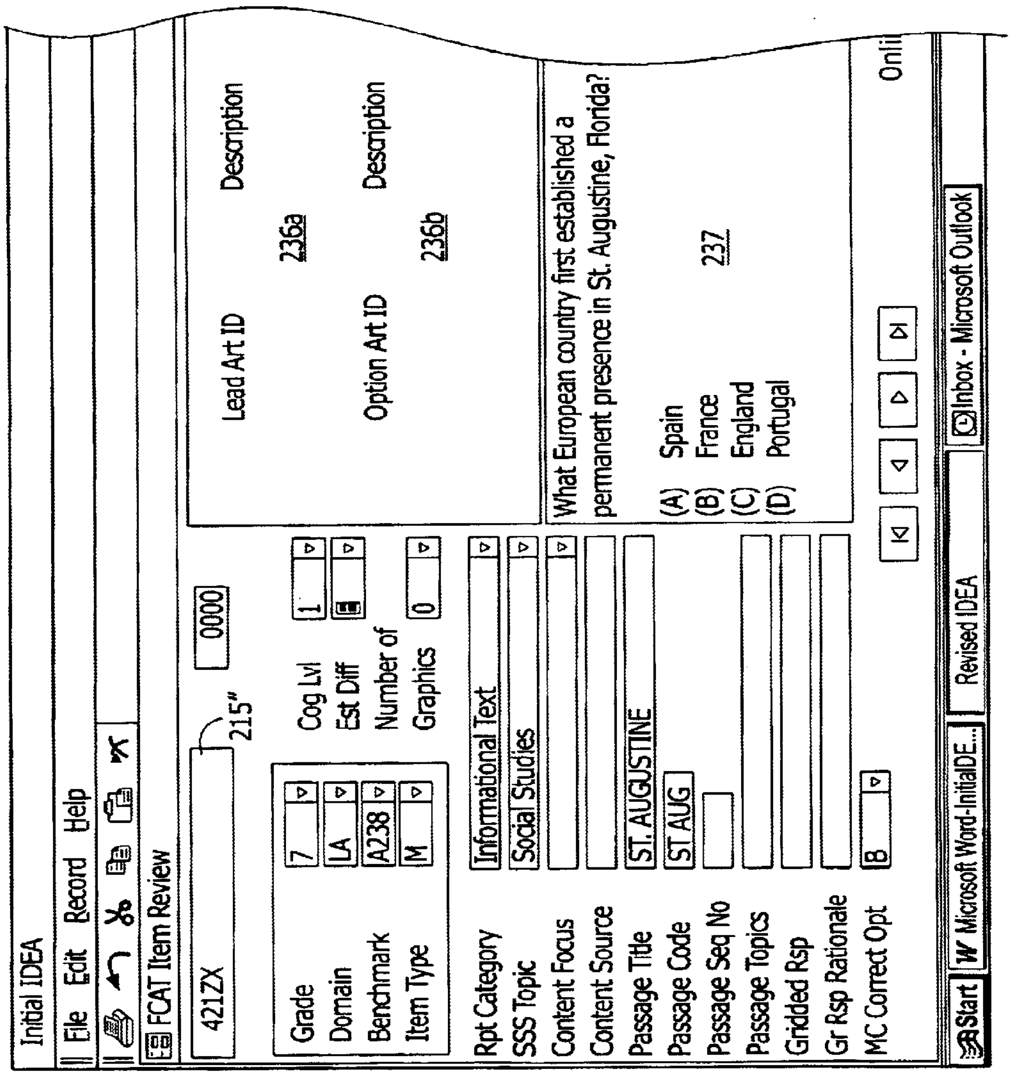

Filemaker Pro - [Item Database.FP3]

File Edit Mode Select Format Script Window Help

Form_B

Info Close View as Form View as List Reports New Record Delete Record Find Record Find All Records Sort Records Form Builder Show All Selections Remove All Selections Select or Deselect Found Set Summary Statistics Passage Analysis Item Count View Selections Records: 15406

Unsorted 446 445 448 447

| Core | Field | Abbrev. | Short | Item Seq. | | | | Content Area | Passage Code | Reporting Cat. | Item Code | P Value | Point Bis. | Equated Item Diff. | Correct Answer | SOL Desc. | Item Not Approp. | Select |
|---|---|---|---|---|---|---|---|---|---|---|---|---|---|---|---|---|---|---|
| X | X | X | X | 12 | 5 | 4 | 5 | Mathematics | | Number and | MK030214 | 093 | 00.306 | -001.470 | D | The student, given an | | ✓ |
| X | | | | | | | | Mathematics | | Measurement and | MK120301 | 095 | 00.334 | -001.934 | C | The student will | | ✓ |
| | X | | | | | | | Mathematics | | Probability and | MK170301 | 085 | 00.416 | -000.600 | C | The student will | | ✓ |
| | | X | | | | | | Mathematics | | Patterns, | MK200300 | 089 | 00.419 | -000.995 | C | The student will | | ✓ |
| | X | | X | | | | | Mathematics | | Measurement and | M1120202 | 066 | 00.428 | 000.683 | C | The student will use | | ✓ |
| | | | | | | | | Mathematics | | Measurement and | M1150204 | 080 | 00.357 | -000.193 | A | The student will | | |
| | X | | | | | | | Mathematics | | Patterns, | M1200210 | 086 | 00.389 | -000.651 | B | The student will sort | | ✓ |
| X | | | | | | | | Mathematics | | Number and | M2030209 | 080 | 00.251 | -000.149 | D | The student will | | ✓ |
| | X | | | | | | | Mathematics | | Number and | M2040205 | 030 | 00.140 | 002.527 | B | The student will | | ✓ |
| | | X | | | | | | Mathematics | | Number and | M2040305 | 041 | 00.385 | 001.970 | A | The student will | | ✓ |
| | | | | | | | | Mathematics | | Number and | M2050205 | 064 | 00.405 | 000.772 | C | The student will count | | |
| | | | | | | | | Mathematics | | Number and | M2050305 | 056 | 00.474 | 001.185 | B | The student will count | | |
| | | | | | | | | Mathematics | | Computation and | M2100207 | 063 | 00.569 | 000.823 | C | The student, given a | | |
| | | | | | | | | Mathematics | | Computation and | M211A202 | 073 | 00.405 | 000.287 | D | The student will count, | | |
| | | | | | | | | Mathematics | | Computation and | M211B203 | 063 | 00.146 | 000.837 | D | The student will | | |
| | | | | | | | | Mathematics | | Measurement and | M2130201 | 063 | 00.414 | 000.853 | C | The student, given grid | | |
| | | | | | | | | Mathematics | | Measurement and | M2140204 | 056 | 00.351 | 001.226 | C | The student will | | |
| | | | | | | | | Mathematics | | Measurement and | M2150204 | 037 | 00.239 | 002.183 | D | The student will | | |
| | | | | | | | | Mathematics | | Measurement and | M2180201 | 085 | 00.323 | -000.594 | C | The student will | | |
| | | | | | | | | Mathematics | | Probability and | M2220212 | 078 | 00.456 | -000.035 | B | The student, given a | | |
| | | | | | | | | Mathematics | | Patterns, | M2260202 | 077 | 00.517 | 000.039 | C | The student will solve | | |
| | | | | | | | | Mathematics | | Patterns, | M2260300 | 075 | 00.561 | 000.171 | A | The student will solve | | |

100 Browse

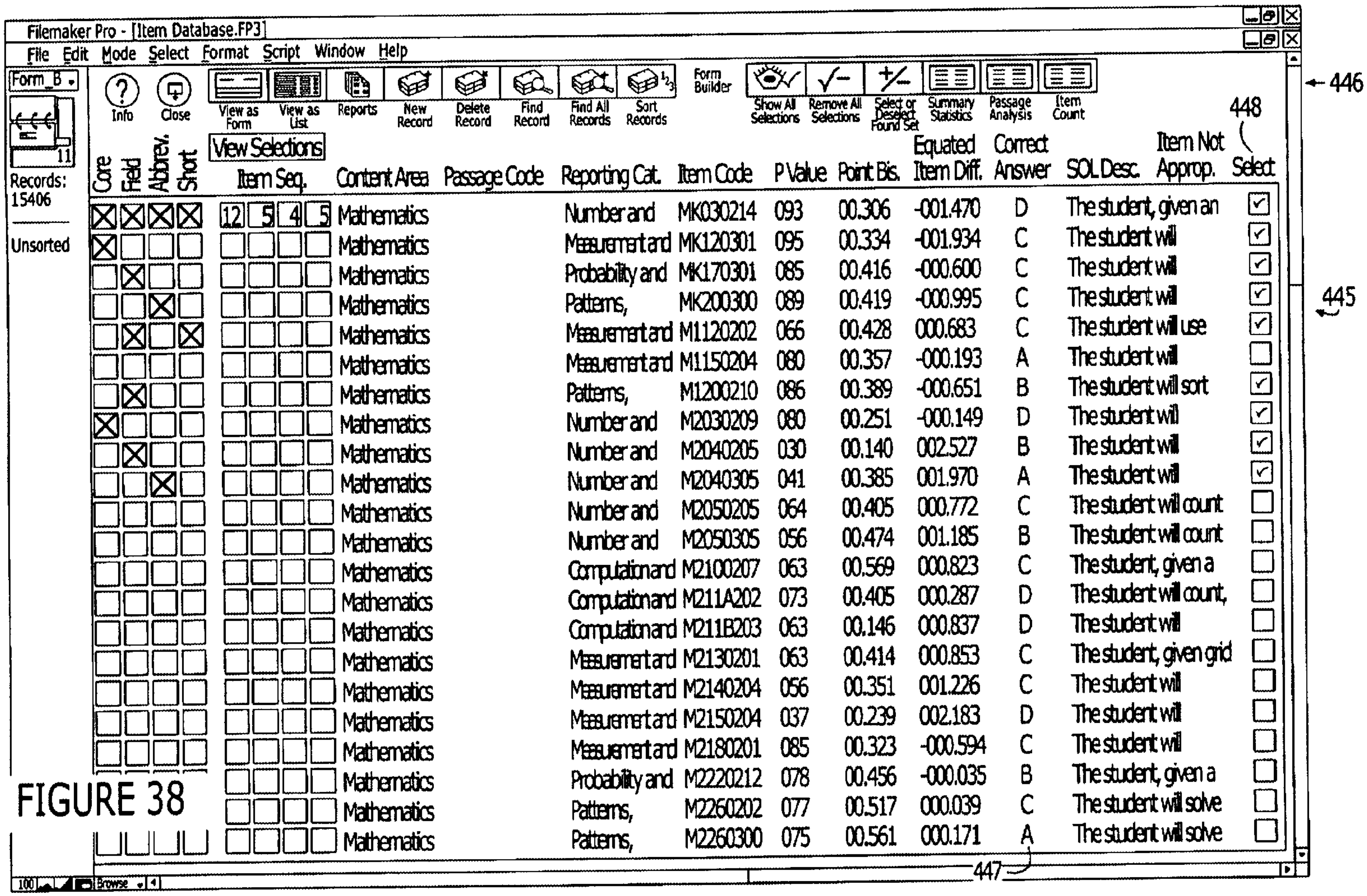

FIGURE 38

TEST ITEM CREATION AND MANIPULATION SYSTEM AND METHOD

BACKGROUND OF THE INVENTION

1. Field of the Invention

The present invention relates to test and test item creation and storage systems and methods, and, more particularly, to such systems and methods that are electronically based.

2. Description of Related Art

Instruments created to examine a student's knowledge of a particular discipline typically include a series of questions to be answered or problems to be solved. Tests have evolved from individually authored, unitarily presented documents into standardized, multiauthor documents delivered over wide geographic ranges and on which multivariate statistics can be amassed. As the importance of test results has increased, for myriad educational and political reasons, so has the field of test creation experienced a concomitant drive towards more sophisticated scientific platforms, necessitating increased levels of automation in every element of the process.

Creating items for assessment testing must be accompanied by a method for synthesizing information for the construction of an examination from some or all of the items. In the past, and continuing to the present time, test item authors have used "item cards" containing the "item" (here intended to mean the "item stem"), which refers to the question or problem, the options (correct answer and "distractors"), associated artwork and/or graphics, and statistical data. This information was pasted onto card stock to form the item card, and a collection of item cards referred to as an "item bank." The physical card medium remains in place owing to familiarity and to a lack of electronic alternatives with desired features.

Clearly, the use of collections of physical cards is less than ideal in the current electronic environment, for many reasons, among which are: time to sort items according to one or more predetermined criteria; difficulty in accessing a particular item; physical limitation on the amount of information recordable and on the life span of the medium; security issues; difficulty in editing an item; the need to translate the data from physical form into electronic form when constructing a test; the inability to transfer the item information quickly between multiple users and for multiple users to view an item simultaneously in a plurality of locations; and the inability to present updated statistical information calculated as a function of a selected variable while maintaining previously calculated data.

All these limitations are amenable to an electronic solution, which has not been available in a unitary system that possesses the flexibility to operate adaptively over multiple platforms.

Related systems and methods include those of Lewis et al. (U.S. Pat. No. 5,059,127), Haga et al. (U.S. Pat. No. 5,211,563), Evans (U.S. Pat. No. 5,274,749), Daniels et al. (U.S. Pat. No. 5,310,349), Bloom et al. (U.S. Pat. No. 5,597,312), Schoolcraft (U.S. Pat. No. 5,729,751), Griswold et al. (U.S. Pat. Nos. 5,749,736 and 5,890,911), Yanagida et al. (U.S. Pat. No. 5,775,918), Trif et al. (U.S. Pat. No. 5,870,731), Ho et al. (U.S. Pat. No. 5,934,909), Heinberg (U.S. Pat. No. 5,954,516), Kershaw et al. (U.S. Pat. No. 5,827,070), Sanchez-Lazer et al. (U.S. Pat. No. 6,000,945, assigned to ETS), and Sweitzer et al. (U.S. Pat. No. 6,018,617).

Commercial computer-based systems known in the art include those of TestBuilder (William K. Bradford Publishing Co.), MicroCAT™ (Assessment Systems Corp., St. Paul, Minn.), CATBuilder™ (CAT, Evanston, Ill.), Curriculum Director (Bookette), Examiner's Plus (Pilot Software Ltd., Ankara, Turkey), and TestMate products (Master Computer Systems, Inc., and CTB/McGraw-Hill, Monterey, Calif.).

SUMMARY OF THE INVENTION

It is therefore an object of the present invention to provide an automated system and method for creating test items.

It is an additional object to provide an automated system and method for accessing created test items.

It is a further object to provide an automated system and method for creating a test from stored test items.

It is another object to provide an automated system and method for electronically coordinating a plurality of elements related to a test item.

It is yet an additional object to provide an electronic database of test items.

It is yet a further object to provide such a database having statistical data associated with at least some of the test items.

It is yet another object to provide a system and method for coordinating a plurality of phases of test item creation and review.

An additional object is to provide such a system and method for linking a plurality of data on test items.

A further object is to provide such a system and method for facilitating and accessing of a selected test item or a plurality of related test items.

These objects and others are attained by the present invention, a system and method for creating a test for administration to a student. The method comprises the steps of creating a plurality of test items using unitary software means. Each test item has a plurality of elements, including an item stem (a question or problem), one or more options (a choice of answers, including one correct answer and at least one of a "distractor" or an open-ended answer), and metadata-related to the test item.

The next step, if desired, comprises adding to at least one of the test items an image using the software means. The image may comprise, for example, a graphic or a piece of artwork. Each test item is then stored in an electronic database. Access to each test item in the database is provided, wherein the test items are searchable by at least one of the test item elements.

The test creator then electronically selects at least one test item from the database, and views at least a portion of the selected test item. If desired, the at least one selected test item is assembled into a test.

The system of the present invention comprises communicating hardware and software means for performing these steps.

Another aspect of the present invention comprises a system and method for creating a test item. The method comprises the steps of accessing a database software means, which is used to compose metadata relating to a desired item using the database software means. The record is stored in an electronic database also using the database software means. A word processing software means is accessed via a link through the database software means, and a textual portion of a test item is created with the word processing software means. The textual portion is then stored in the record.

Next, if desired, a graphical image desired for merging with the textual portion is accessed from a medium, and the graphical image is electronically linked with the textual portion. Finally, the linked graphical image is stored in the electronic database.

The system of this aspect of the present invention comprises linked word processing, database, and graphics processing software adapted to perform the above-listed steps.

It is to be understood herein that the term "student" is not intended to be limited to a school attendee; rather, a target of the test items of the present system and method may comprise, for example, a person desiring certification in a particular field or profession, such as a technical, legal, medical, or other discipline. The creation and manipulation of test items for any venue are thus intended to be encompassed under the present invention, as well as tests delivered by any means known in the art, including via hard copy, computer, and Internet access.

It is also to be understood herein that the term "item" is not intended to be limited to word-based modes; rather, alternate modes of administration such as oral/auditory, video, or graphic interactions.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 8 is a sample item report printout.

FIG. 11 illustrates an exemplary item data entry screen for the individual module.

FIG. 12 illustrates an exemplary item data revision screen.

FIG. 38 illustrates the test construction application.

DETAILED DESCRIPTION OF THE PREFERRED EMBODIMENTS

Figure 1:
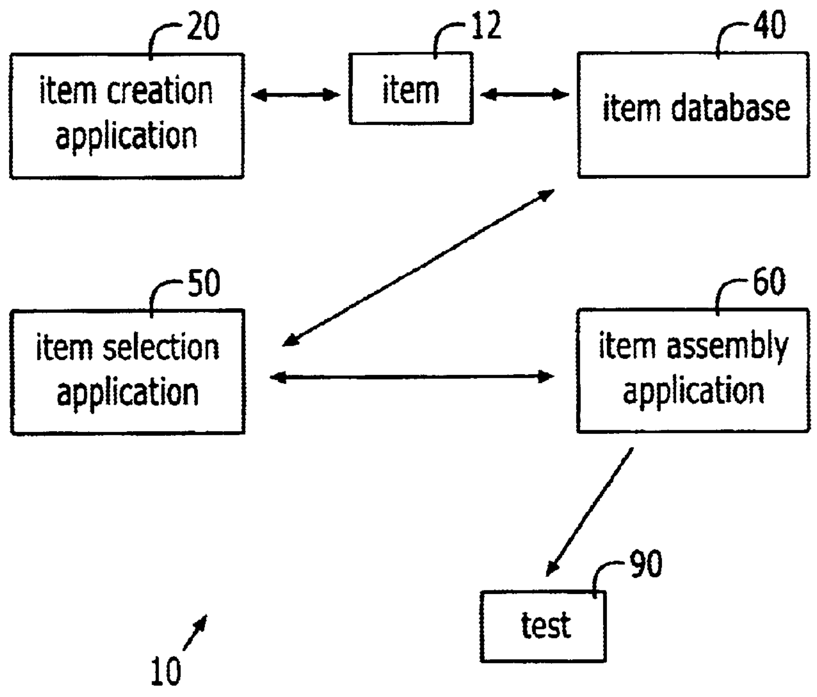
FIG. 1 is a schematic diagram of the main functional components of the electronic test item creation and storage system.

A description of the preferred embodiments of the present invention will now be presented with reference to FIGS. 1–38.

The overall system 10 comprises a linked set of applications through which a user can coordinate the creation and storing of test items 12 and associated objects. Broadly, as illustrated schematically in FIG. 1, the elements comprise an item creation application 20, an item database 40, an item selection application 50, and a test item assembly application 60 to create a test 90.

Item Creation Application

The item creation application 20 permits a user to develop an item 12 via interfaces with a plurality of linked software means for entering textual and graphical data and metadata associated therewith. The form of the created item 12 is preferably adapted for electronic database storage, porting over a network to a central site and to a reviewer, and viewing in a plurality of formats.

Figure 2:
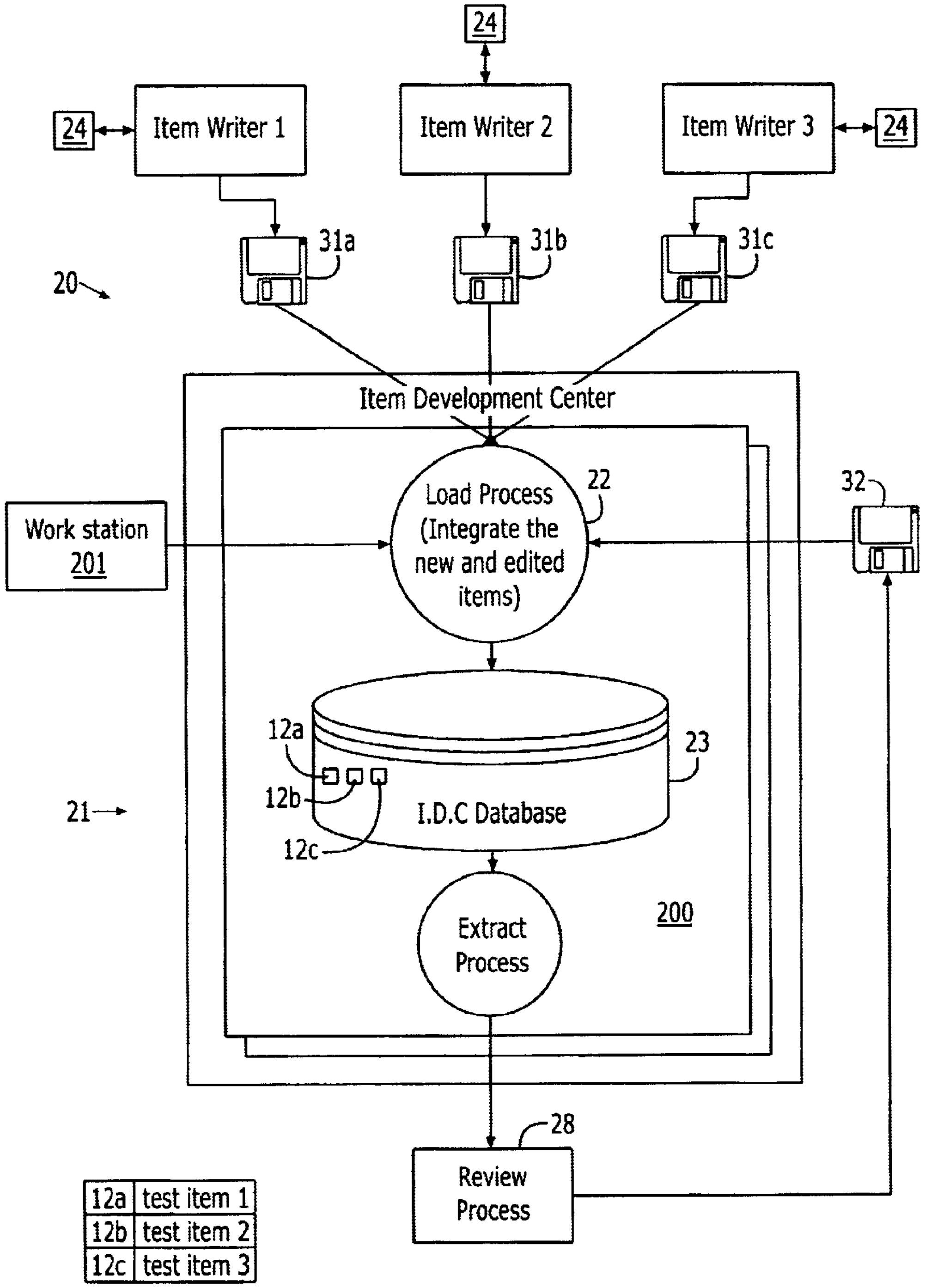
FIG. 2 is an overview chart of the three modules of the test item creation system.
Figure 3:
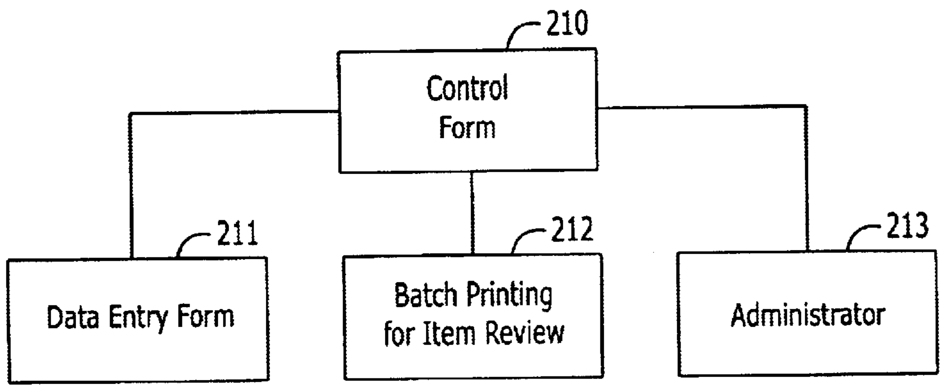
FIG. 3 is a hierarchical chart for the central module.
Figure 4:
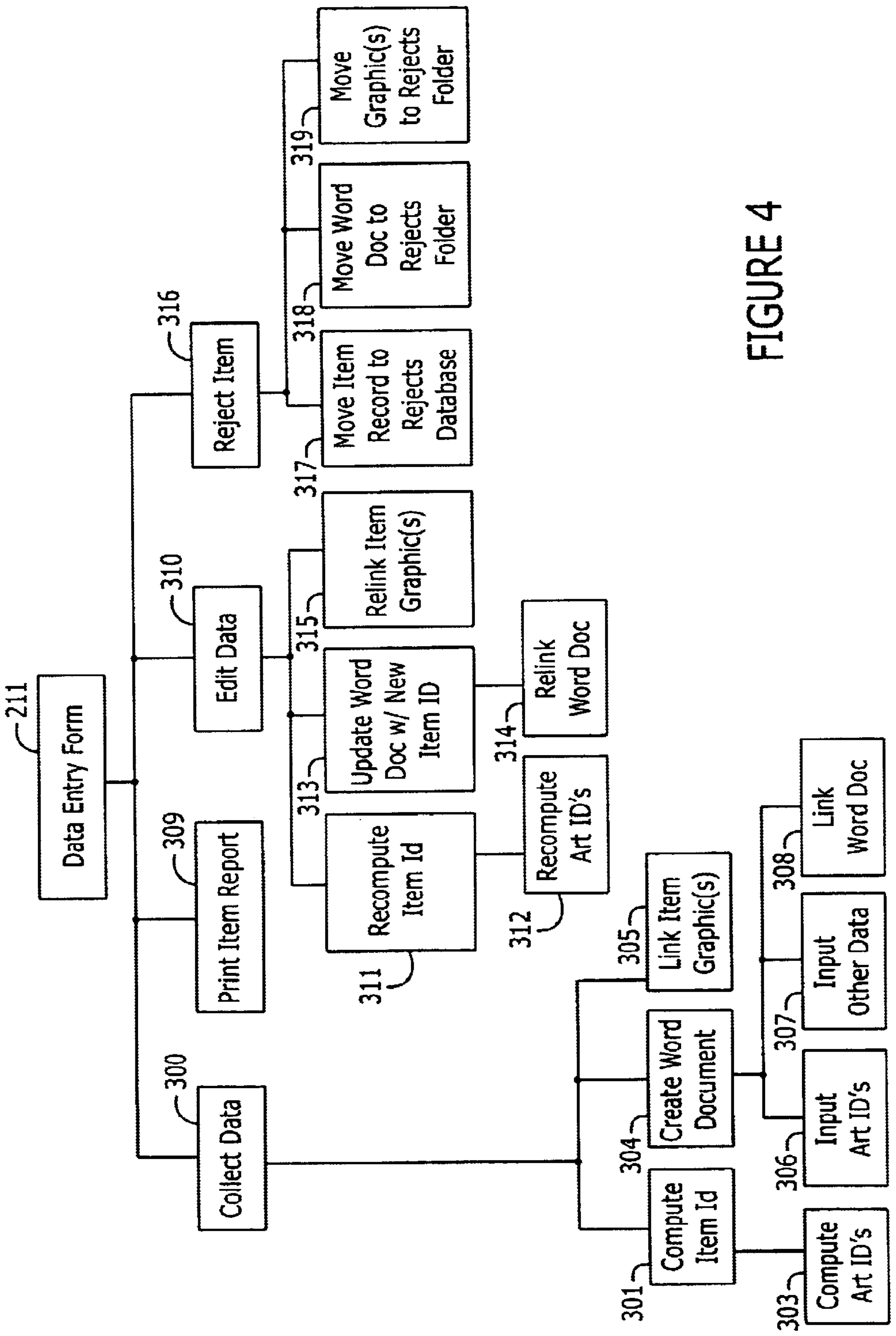
FIG. 4 is a hierarchical chart for the data entry form of the central module.

The item creation application 20 comprises a plurality of modules, here three (FIG. 2). A central module 21, an individual module 24, and a review module 28. The individual module 24 is shown as being accessed by three item writers. Item Writer 1—Item Writer 3.

The Central Module. The central module 21 comprises a data-entry package 22 and an electronic database 23 located, for example, on a server 200 housed at a main administrative location. A user accessing the server 200 is assigned a unique code for identification purposes. In a preferred embodiment, the central module 21 comprises a multiuser database application, comprising a "front end" installed on a user's workstation 201 and a "back end" installed on the server 200. The item repository 23 stores item text, item graphics, and item information (e.g., metadata). FIG. 2. for example, indicates the item repository 23 as containing three test items 12*a*–12*c*. The graphics may be stored in any form known in the art, such as, but not intended to be limited to, GIF, TIFF, EPS files, and bitmapped images. The repository data may be viewed and modified as desired.

Access to the central module 21 is gained via a control form 210 (FIG. 3), from which a password is required to enter one of three applications 211–213 in this embodiment. Selecting the data entry form 211 brings up a screen 214 such as that depicted in FIG. 6. Intervening screens may also appear depending upon the embodiment, such as one offering a choice as to a particular project the user desires to work on.

The process of data entry (FIG. 4; see also data flow diagram, FIG. 7) includes selecting the data entry form 211 and proceeding to the data collection pathway (block 300). A unique item identifier, Item ID 215 is computed (block 301) by the system 21 upon the user's entry of information via drop-down menus such as, but not intended to be limited to, Grade 216, Domain 217 (i.e., subject area), Benchmark 218, which is a term of art for "content standards" or "objective," and Item Type 219. The remaining four numbers of Item ID 215 are computed sequentially. A second number, CID 220, is also assigned (block 302, FIG. 7) to each item as it is input; this CID 220 is unique and immutable.

If desired for presentation with the item 12, an artwork/graphics identifier is assigned (block 303) to each piece of art. The main piece of art to be viewed (see, for example, 330 in FIG. 27) is coded and entered into the appropriate block 221, with subsequent pieces of art coded and entered into the subsidiary Art ID blocks 222 (block 306). It can be seen in this exemplary case that the art identifiers comprise the Item ID 215 plus a sequential code following a period ".ARx."

The textual portion of the item stem and responses is created (block 304) using a word processing application, here Microsoft Word, in the text entry block 223. Associated artwork is saved and linked (block 305) to the Art IDs. In the present embodiment, linked artwork may be viewed via a link to a viewing application, such as Adobe® Acrobat Reader, although this is not intended as a limitation. Herein only viewing is permitted; no editing is permitted. In an alternate embodiment editing may be permitted.

Additional data are entered (block 307) as required/desired, and the textual document is automatically linked (block 308) via the Item ID 215.

From the data entry form 214 (block 211) an item report can be printed (block 309, button 224 on FIG. 6), which yields the printout illustrated in FIG. 8. The data may also be edited (block 310), wherein, in similar fashion to the steps under block 300, an Item ID 215 is recomputed (block lot 311), as well as the Art IDs (block 312). The textual document may be edited and linked to the new Item ID 215 (block 313), whereupon it is relinked (block 314), as is the artwork (block 315). Whenever an item is modified, the database record is modified as to the date and time of modification.

The item may also be rejected (block 316) by selecting button 225 on screen 214. This selection activates the system 21 to move the item record to the rejects database (block 317) and move the textual document and the artwork to the rejects folder (blocks 318,319).

Searching on one or more fields may also be performed, as well as requesting to view data in a spreadsheet format, which enables the user to compare field values across a number of records. In addition, a record may be duplicated if desired.

Returning to FIG. 3, a selection may be made (block 212) to print in batches one or more items preparatory to a review process 28 (FIG. 2). Items may be selected, for example, in groups for such a batch printing, including by project, administration, grade, and/or benchmark.

Figure 5:
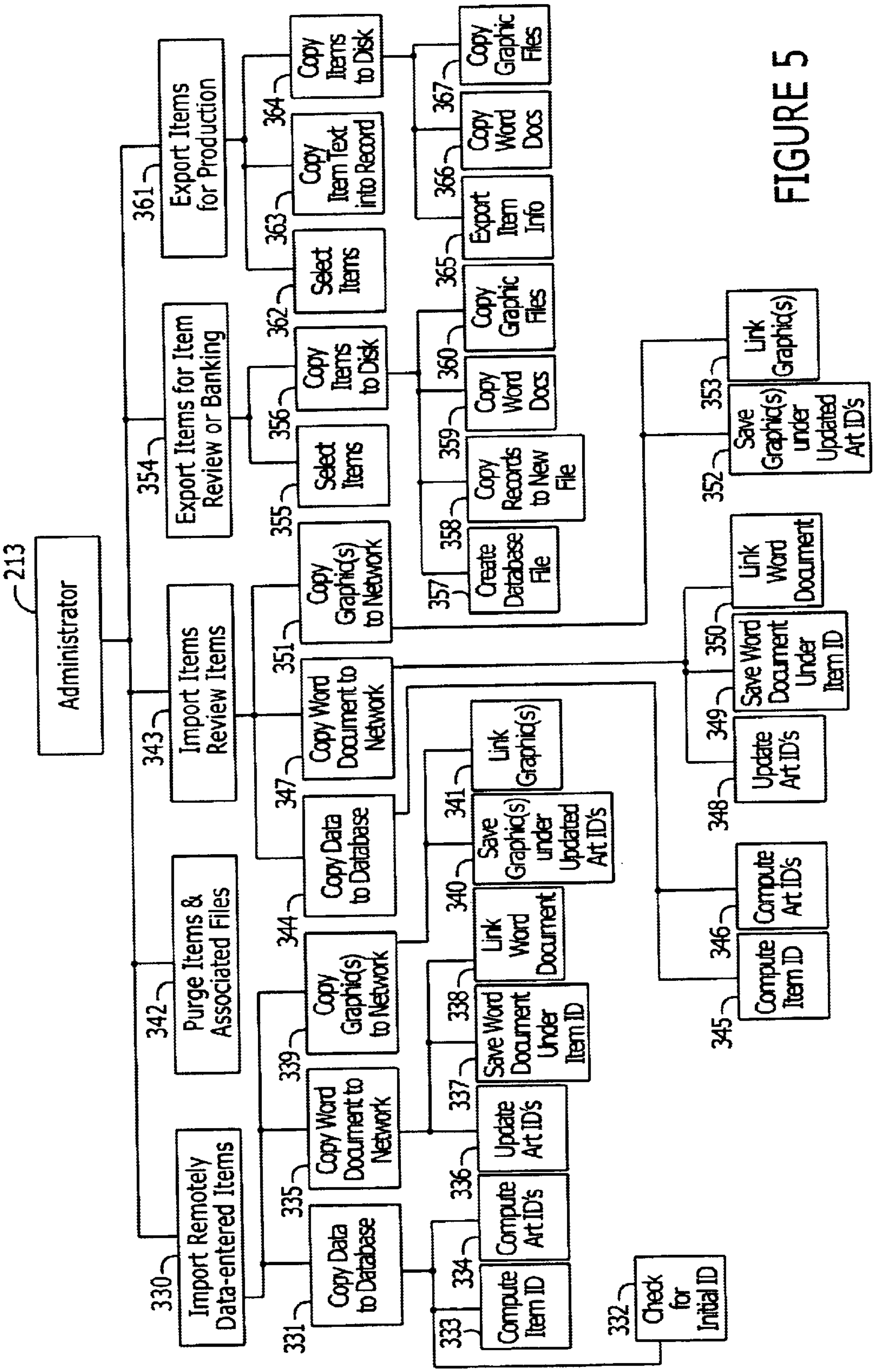
FIG. 5 is a hierarchical chart for the administrator functions of the central module.
Figure 6:
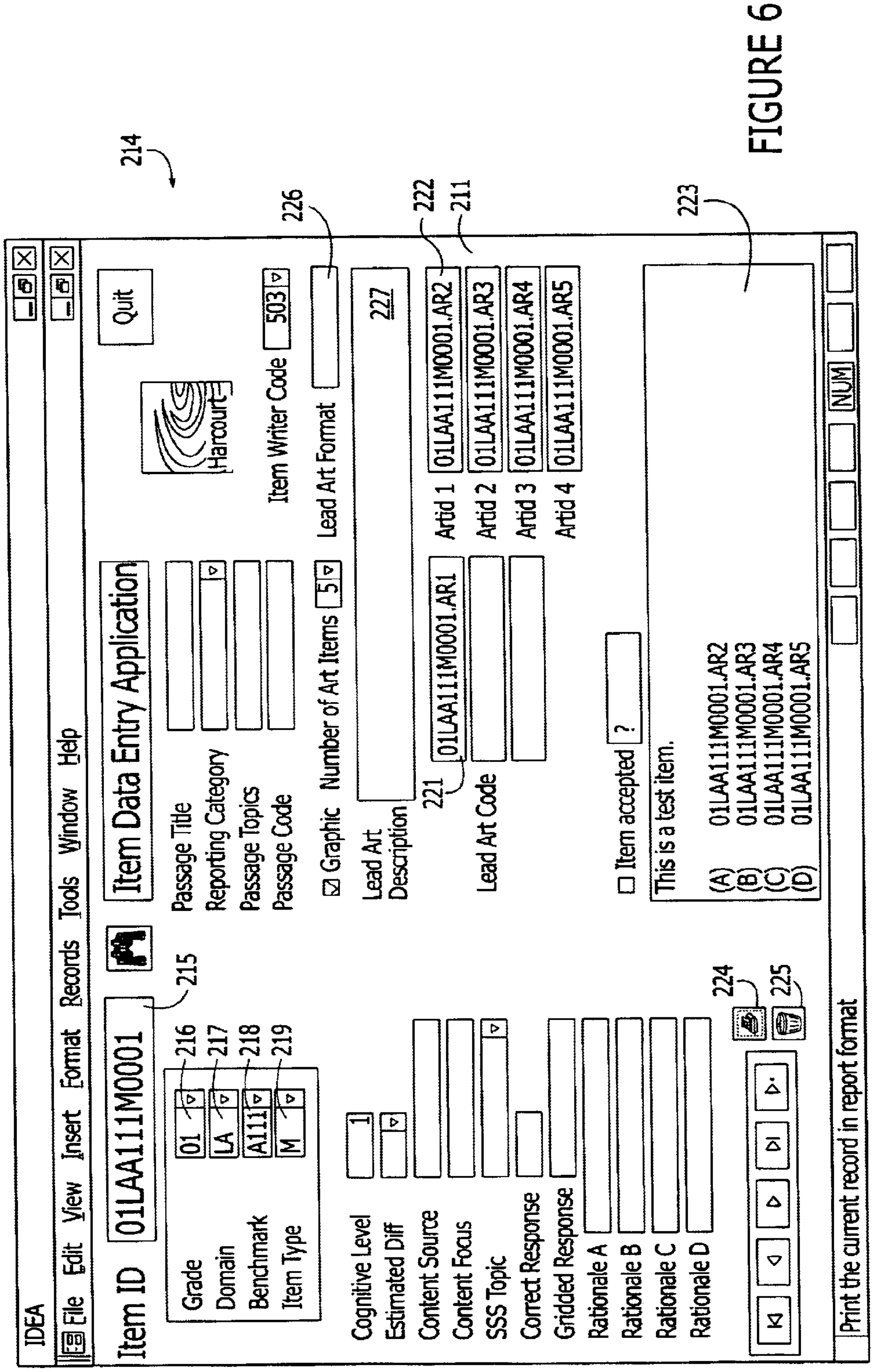
FIG. 6 illustrates an exemplary item data entry screen.
Figure 7:
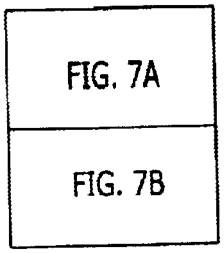
FIG. 7 is a data flow chart for the central module.
Figure 7B:
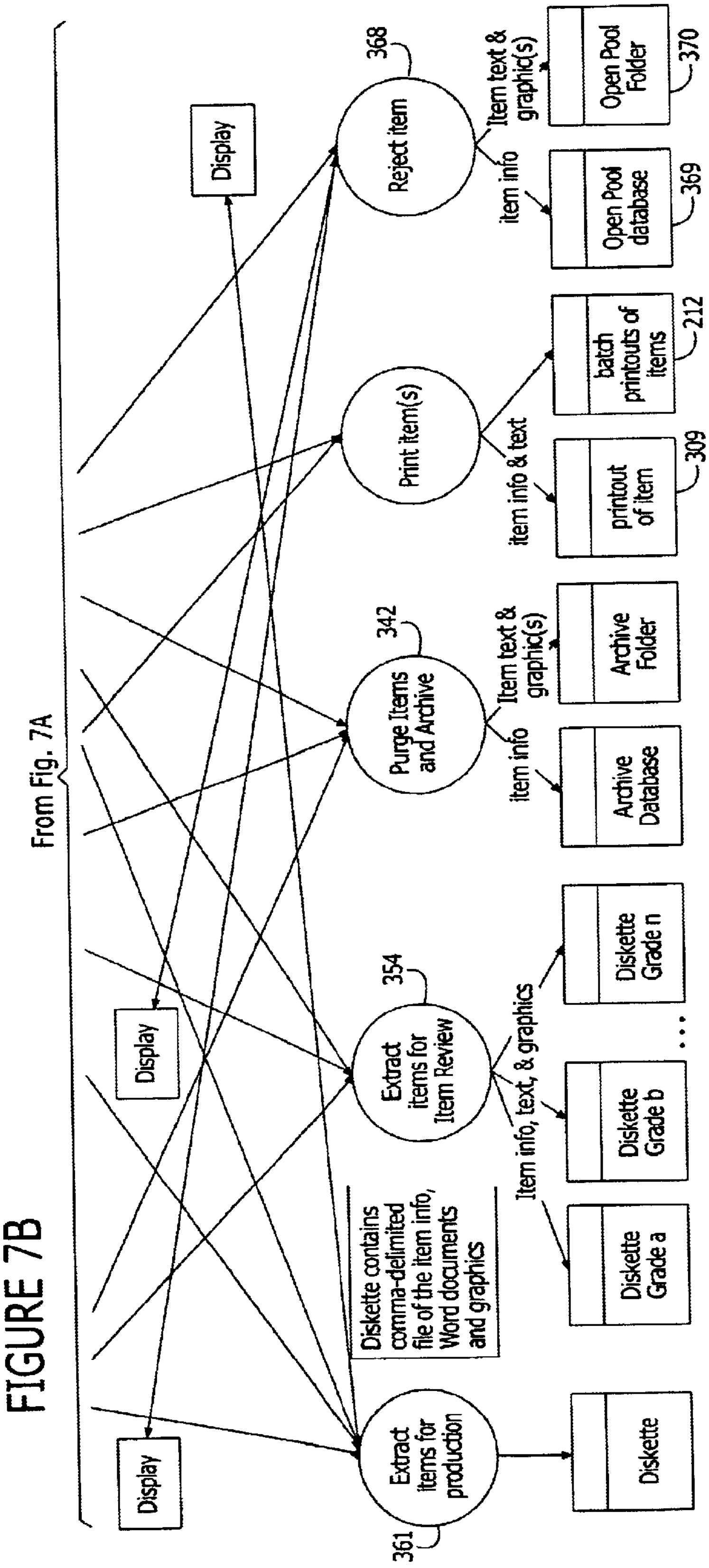

If the "Administrator" 213 application is selected from the control form 210, a password is required to display another series of selections (FIG. 5). As a first selection, the administrator may choose to import remotely data-entered items from a medium (block 330), such as a disk 31 (FIG. 2), although this is not intended as a limitation. The source for such items will be discussed in the following, under the description of the individual module 24.

Once the item is imported, the data are copied to the database 23 (block 331), which automatically includes checking for an initial identifier (block 332), computing an Item ID 215 (block 333), and computing the art IDs (block 334). The textual document is also copied onto the server (block 335), whereupon the system 20 automatically updates the art IDs (block 336), saves the textual document under the Item ID (block 337), and links the textual document (block 338). Finally, the graphics are copied onto the server (block 339), which includes saving the artwork under updated art IDs (block 340) and links the artwork (block 341).

The administrator also has the power to purge items and their associated files (block 342).

In similar fashion to the data importing process 330, the administrator may select to import an item from those having undergone a review process 28 (block 343). Once the item is imported, the data are copied to the database 23 (block 344), which automatically includes computing an Item ID 215 (block 345) and computing the art IDs (block 346). The textual document is also copied onto the server (block 347), whereupon the system 20 automatically updates the art IDs (block 348), saves the textual document under the Item ID (block 349), and links the textual document (block 350). Finally, the graphics are copied onto the server (block 351), which includes saving the artwork under updated art IDs (block 352) and links the artwork (block 353).

Items can also be extracted by the administrator for the review process 28 or for banking (block 354). The administrator is prompted to select item(s) (block 355) and copy them to some medium, such as a disk (block 356). Items may be selected in groups, such as by project, administration, domain, grade, and/or benchmark. The copying process includes creating a database file (block 357), copying records to a new file (block 358), copying the textual documents (block 359), and copying the art files (block 360).

Finally, the administrator may choose to export items for production (block 361), which entails selecting item(s) (block 362), copying the textual material into a record (block 363), and copying the item(s) to a medium such as a disk (block 364). This process automatically includes exporting the associated item information (block 365) and copying the textual material (block 366) and the graphics files (block 367).

Items can also be rejected (block 368, FIG. 7), which causes them to be removed from the database and placed in an "open pool" database (block 369). The linked text and graphics are moved to an "open pool" folder (block 370).

The Individual Module. The individual module 24 is installable and accessible by a user at any location, for example, a remote site. This module 24 is intended for use, for example, by an independent item writer or a vendor, although this is not intended as a limitation. Typically the item writer will save a completed item on a medium such as a disk 31, CD, or Zip™ drive; alternatively, data may be transferred over an Internet or intranet. Each user will have a password to enter upon sign-in and will have a unique code 27 with which each submitted item will be tagged.

Figure 9:
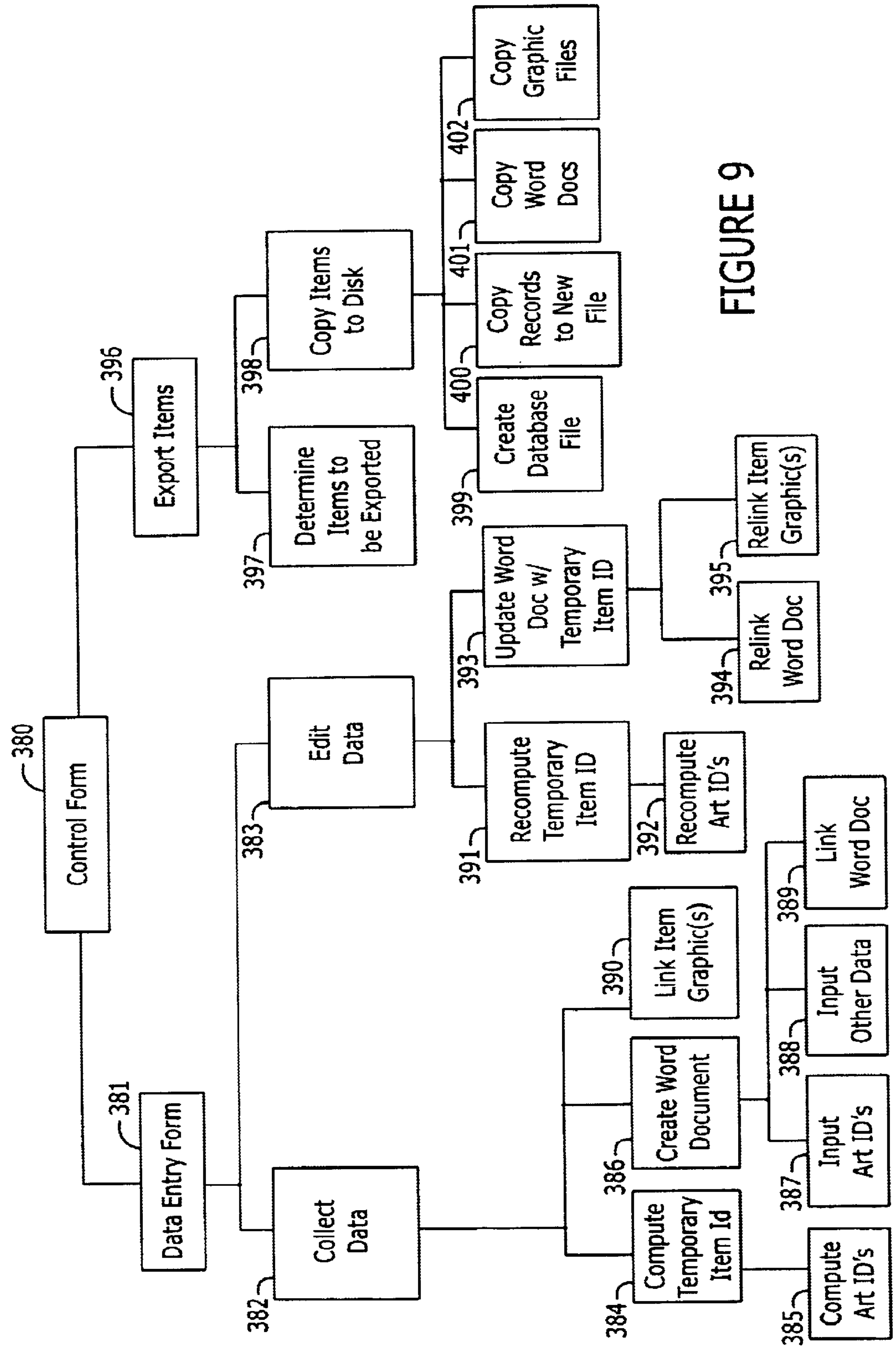
FIG. 9 is a hierarchical chart for the individual module.
Figure 10:
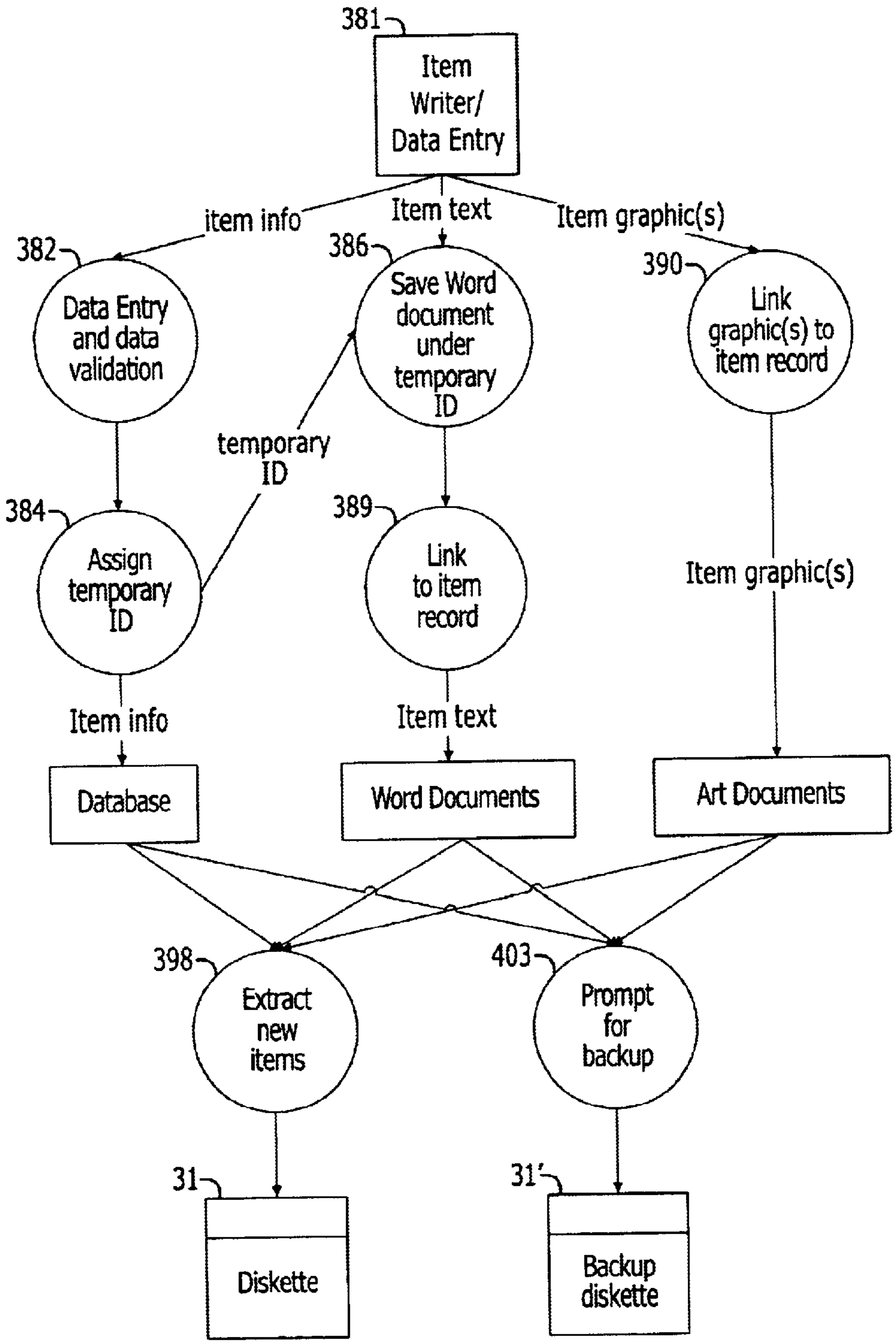
FIG. 10 is a data flow diagram for the individual module.
Figure 13:
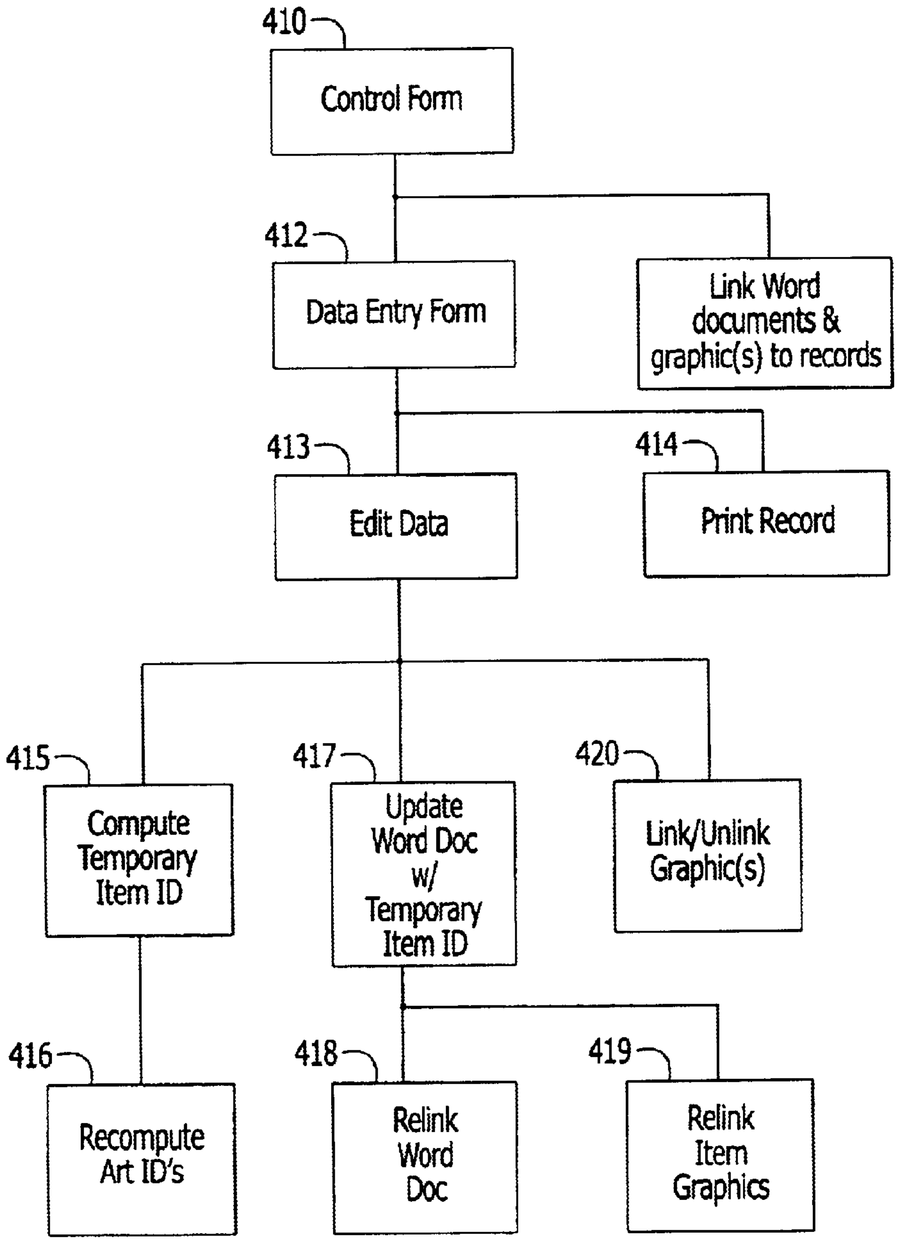
FIG. 13 is a hierarchical chart for the review module.
Figure 14:
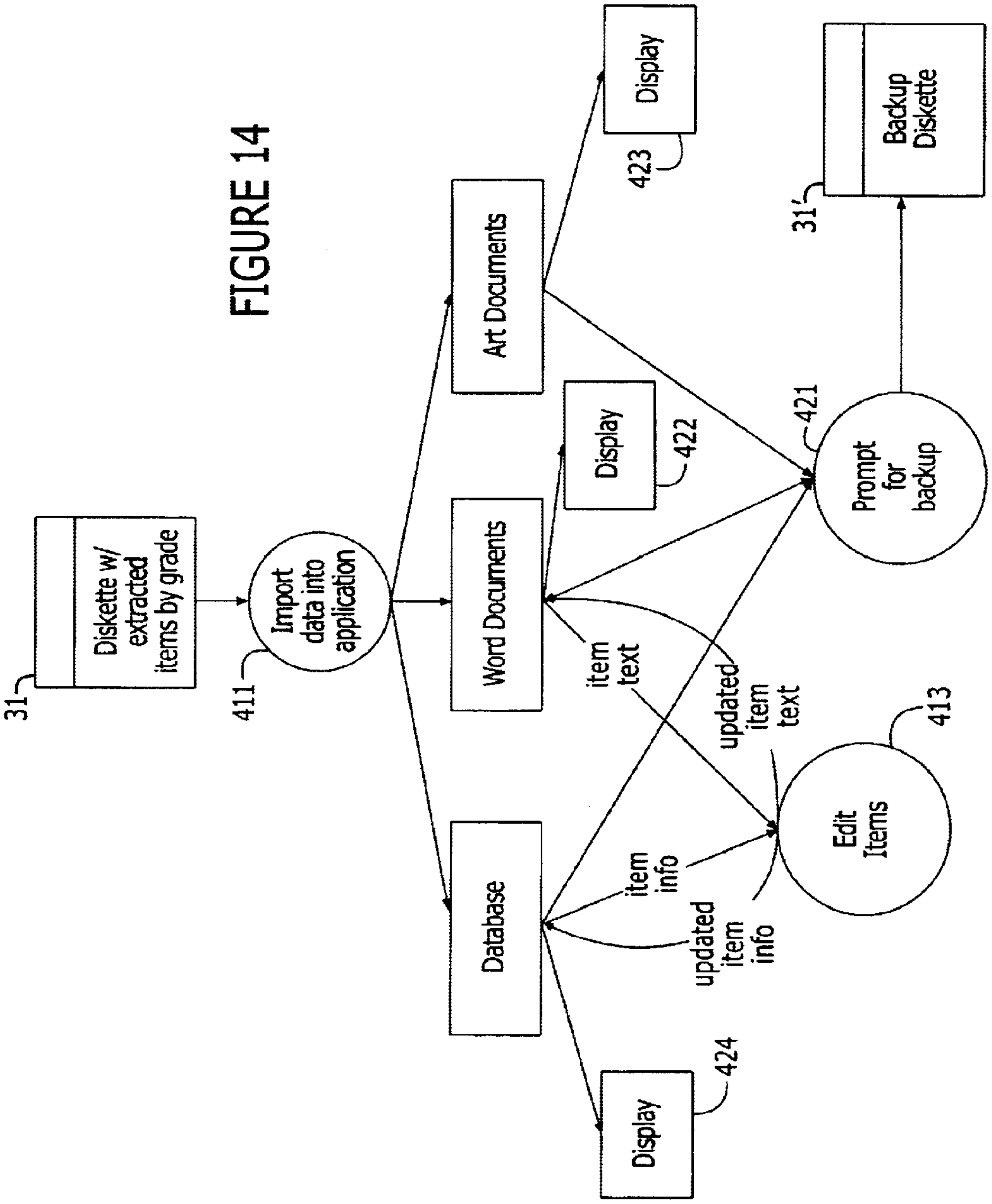
FIG. 14 is a data flow diagram for the review module.

As with the central module 21, the individual module 24 presents the user with a control form 232 (FIG. 11; block 380), from which may be selected an option to enter data (block 381; FIGS. 9 and 10). This in turn presents a choice to collect (block 382) or edit (block 383) data.

Data entry causes a temporary ID 215' to be assigned (block 384), which in an exemplary embodiment comprises the item writer code plus the entry date plus the entry time plus a record number. Based upon this temporary ID 215', artwork is also assigned IDs (block 385) and added to the appropriate fields in the record and into the textual document.

The user creates a textual document 233, such as under a word processor such as Microsoft Word® (block 386), containing the item stem 235 and possible responses 236. The associated artwork IDs shown in FIG. 11 as Lead Art ID **234*a* and Option Art ID 234*b*, are also put into the record (block 387**), with each graphic being linked to an artwork ID. The artwork is stored in a designated folder.

The user fills in the art description fields **234*a*,234*b* and other data onto the screen 232 (block 388) and links the text material (block 389) and the graphics (block 390**). Linked graphics can again be viewed, as through an application such as Adobe Acrobat Reader, with no editing permitted.

If the user elects to edit the data (block 383), a new temporary item ID (block 391) and art IDs (block 392) are computed. The text document may be edited (block 393), which automatically updates the field indicating the date and time the modification occurred, and the text document (block 394) and graphics (block 395) are relinked. Before closing the application, the user is prompted to back up files (block 403).

Returning to the control form 380 selections, the user may choose to export items (block 396), and is in turn prompted to select the items to be exported (block 397). These items are copied to a file, such as on a disk (block 398), which automatically creates a database file (block 399), copies the selected records to a new file (block 400), and copies the text documents (block 401) and graphics files (block 402).

The Review Module. The review module 28 (FIGS. 12–14) is adapted to display items to at least one reviewer for possible editing and updating of the main database 23. The screen 214' displayed here (FIG. 12) is different from that in FIG. 6, in that certain potentially biasing information is not displayed, such as the item writer code 27. Deleting and rejecting an item are not permitted. Again a control form is presented to the reviewer (block 410, FIG. 13), and access is permitted upon entering a password. Typically a database file 31 will be provided, from which data are imported into the review module 28 (block 411).

From the control form the user may select the data entry form 214' (block 412), from which the text document may be edited (block 413), but not the graphics, which may only be viewed (block 423). The document may also be displayed (block 422), as can the other database information (block 424). Printing can also be controlled here (block 414). If the record is modified, a new temporary ID 215" is computed (block 415), as well as art IDs including Lead Art ID **236*a* and Option Art ID 236*b* (block 416), and the record is changed to reflect a new date and time of modification. The text 237 may be updated using the new ID (block 417), whereupon the text (block 418) and the art (block 419) are relinked. The art may also be linked or unlinked during data editing (block 420**).

Upon deciding to exit, the user is prompted to back up the files (block 421) onto a backup medium 31'.

It may be appreciated by one of skill in the art that important features are provided by the present invention: the system 20 is user-friendly in incorporating interactive methodologies that have become familiar to most computer users, with Windows®-type screens having drop-down menus and labeled data-entry boxes. The inventive linking aspects of the system 20 obviate any need to re-enter data; rather, all data are automatically copied to all appropriate records. Data may be entered with formatting preferences in a way familiar to the average user, which aspect is provided by the incorporation of a word processing program.

Further, the system 20 minimizes potential sources of error by performing validation checking to ensure that data entered fall into valid ranges and comprise proper characters (e.g., the presence of an alphabetical character in a field reserved for numbers). In addition, all data may be easily reviewed and edited, with all revisions easily incorporated into the database, again without rekeying data, and careful maintenance of dates, times, and persons(s) making the changes. The electronically linked aspect of the system 20 permits a user to view any selected item in the form in which it will ultimately be presented, including all graphics and formatting.

It will also be obvious to one of skill in the art that alternate forms of data delivery and interaction therewith may be contemplated as being within the scope of the present invention, such as over the Internet in any available content form. Further, interaction with any of the contemplated classes of users may occur in alternate formats. For example, instead of Windows®-type screens appearing, the user may be led through the test item creation application with a series of queries, answers to the queries provided by the user then inserted into the appropriate place(s) in the database or directing a desired display to the user.

Item Database Application

The item database application 40 is adapted to bring item metadata, administration statistics, and artwork into a central location. In a preferred embodiment, the item bank interfaces are created on top of a commercially available package, here FileMaker® Pro v. 5.0, although this is not intended as a limitation. The database may be divided into projects, with each project in turn subdivided into sectors containing statistics, test administration, pull lists, and artwork and text. Alternatively, each project may have a separate database if its own. These divisions are not intended as limitations, however, and one of skill in the art will recognize other potential sectors and methods of categorization.

A particular feature of this aspect of the present invention comprises an organization of functional databases. As the system was developed using tools that are open database connectivity (ODBC) compliant, any aspect of the system is easily transferred to another ODBC-compliant platform, enabling flexibility as technology changes.

The database 23 of the present system 10 has important features specific to the field of testing. Each completed item 12 from the item creation application 20 is stored in the database 23. When any particular item 12 is administered, whether in an experimental setting or an operational test, data and statistics collected from each administration are entered into the database 23. The database 23 may include such elements as, but not intended to be limited to, items, options, correct answers, gridded responses (an answer block permitting a wide range of user-supplied answers), scoring rubrics, author identification, objectives, content area, strands (taxonomy), grade, content focus, cognitive levels, classical statistical analysis, item response theory parameters, graphics, passages, typeset views, administration information, the role the item played in the administration (e.g., core, field test, linking, etc.), and where the item appeared in the test book.

The database 23 does not comprise only a repository; rather, its features permit its use as a research tool usable quickly to identify items that meet predetermined criteria. Such an electronic database 23 is amenable to sorting and searching to yield a desired collection of items, such as, for example, all items addressed to third-grade students, or, in a Boolean search, all items within the domain of mathematics, for the eighth grade, with a context of science, and a cognitive level of 2. Obviously such a search on a paper-based system would be extremely time-consuming.

The feature of being able to display the exact appearance of an item, complete with formatting and graphics, is believed important by psychometricians, by whom presentation is thought to affect the testing of an item.

Figure 15:
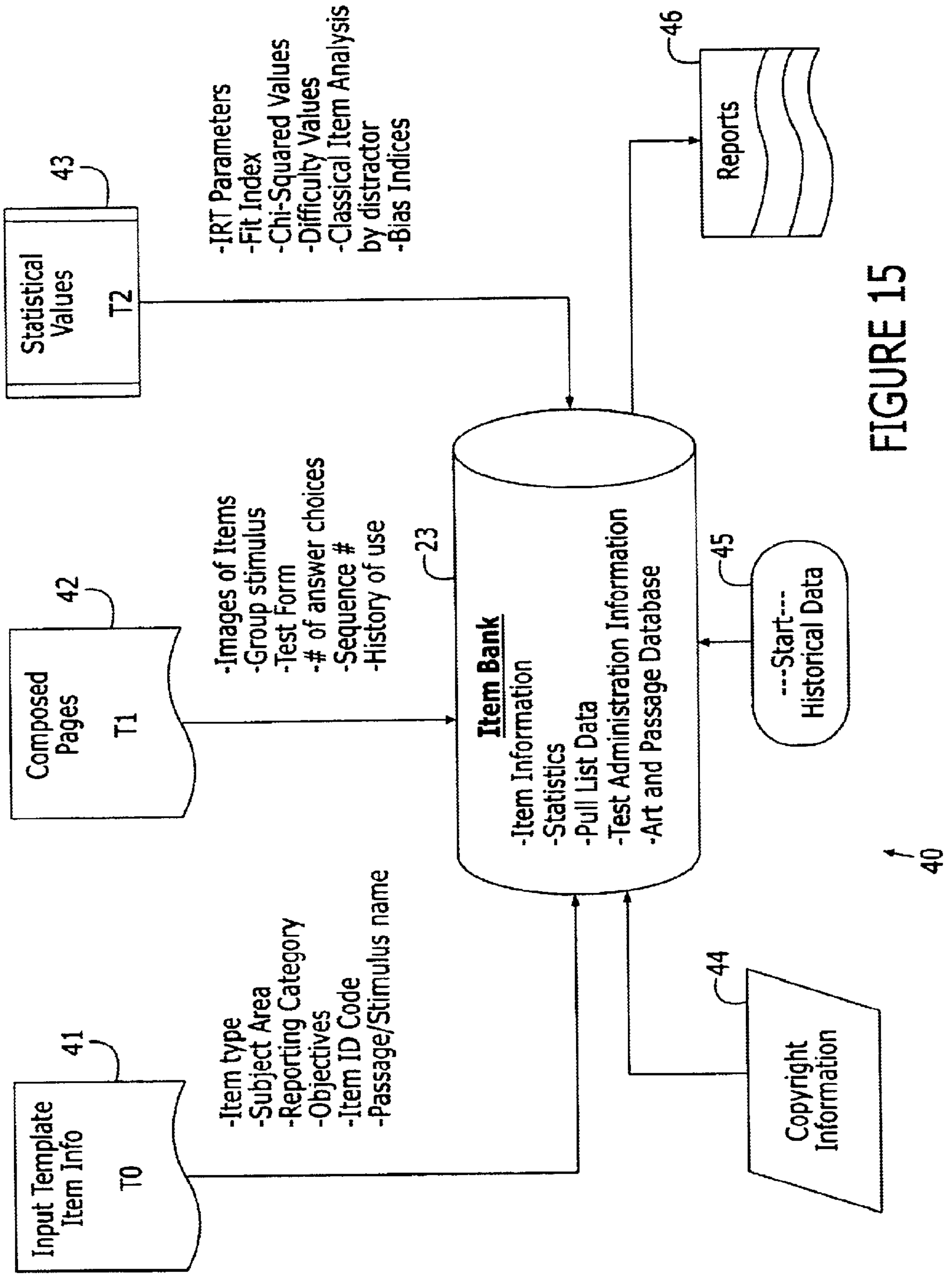
FIG. 15 is a data flow diagram into the item bank.
Figure 16:
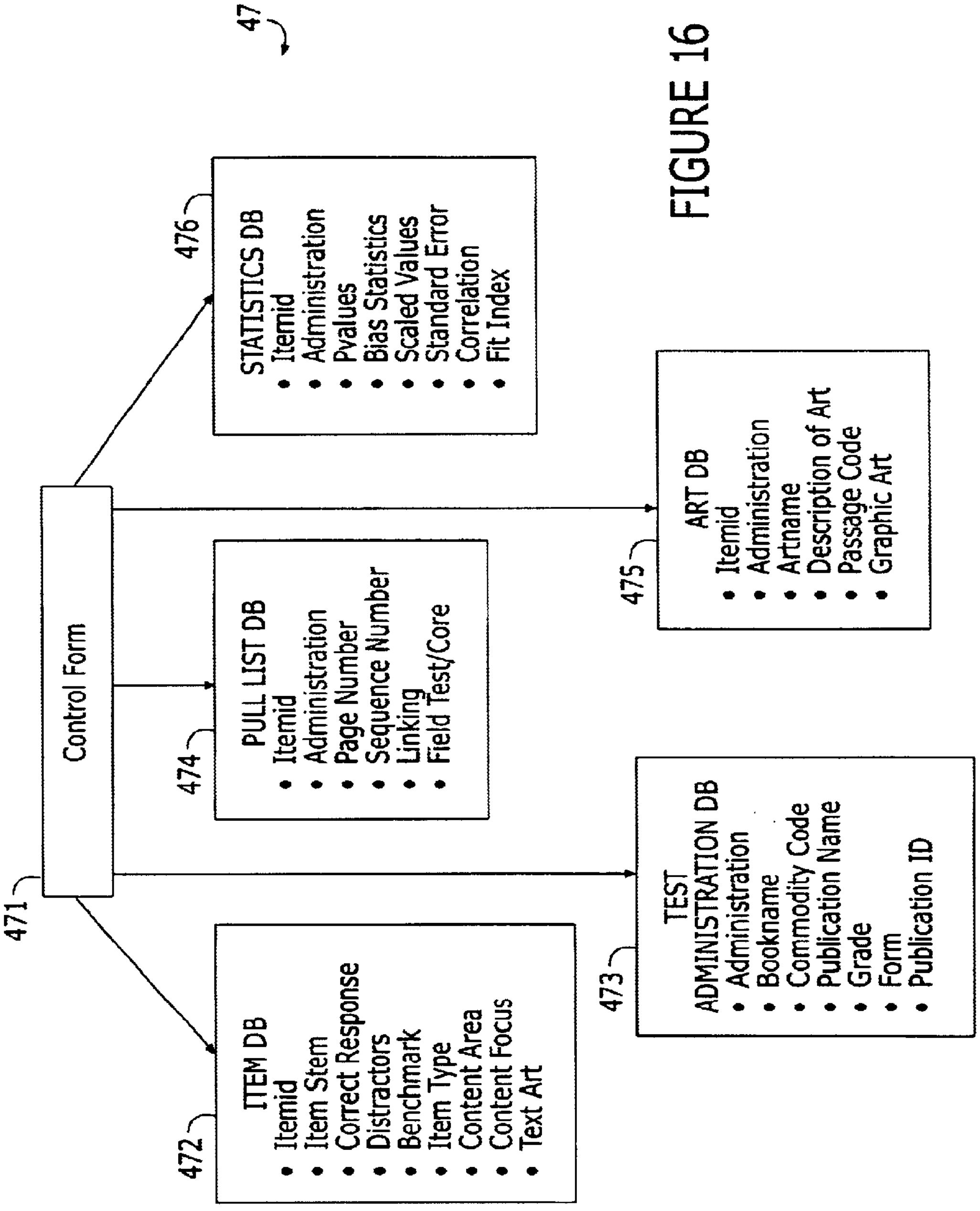
FIG. 16 is a data flow diagram for a first embodiment of database sector access for the item bank.
Figure 17:
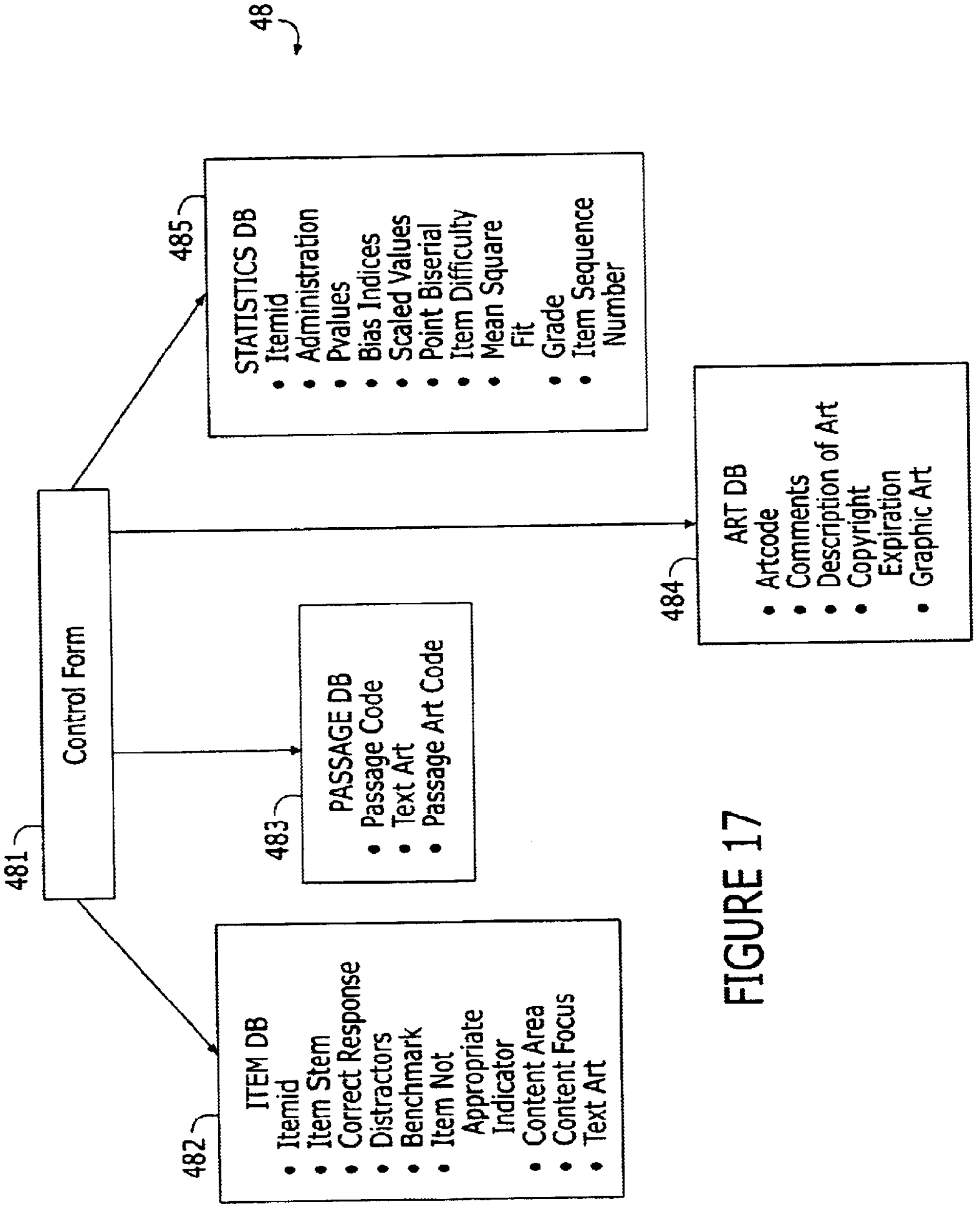
FIG. 17 is a data flow diagram for a second embodiment of database sector access for the item bank.
Figure 18:
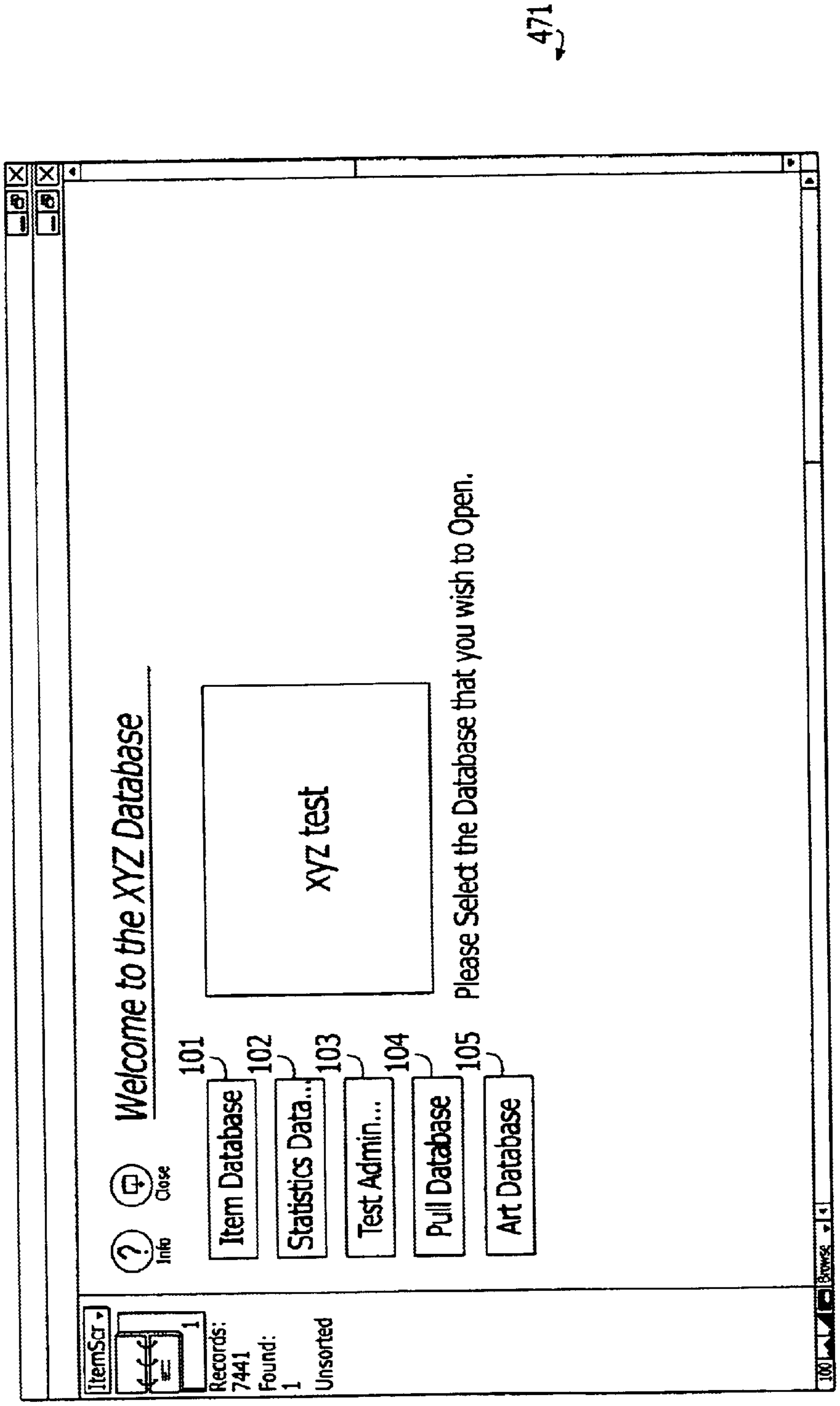
FIG. 18 is an exemplary control screen for the first embodiment.
Figure 19:
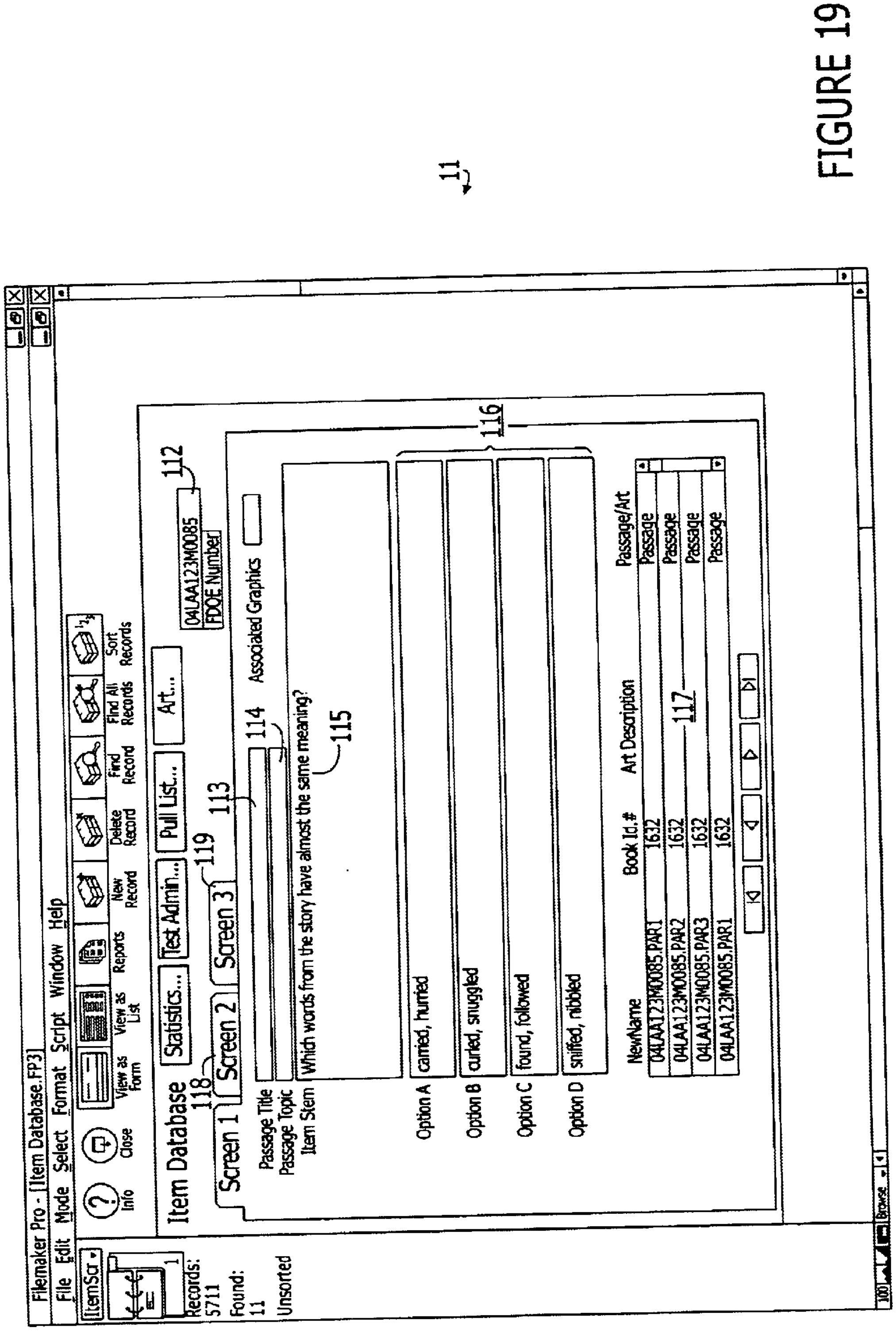
FIG. 19 is a first exemplary item database screen for the first embodiment.
Figure 20:
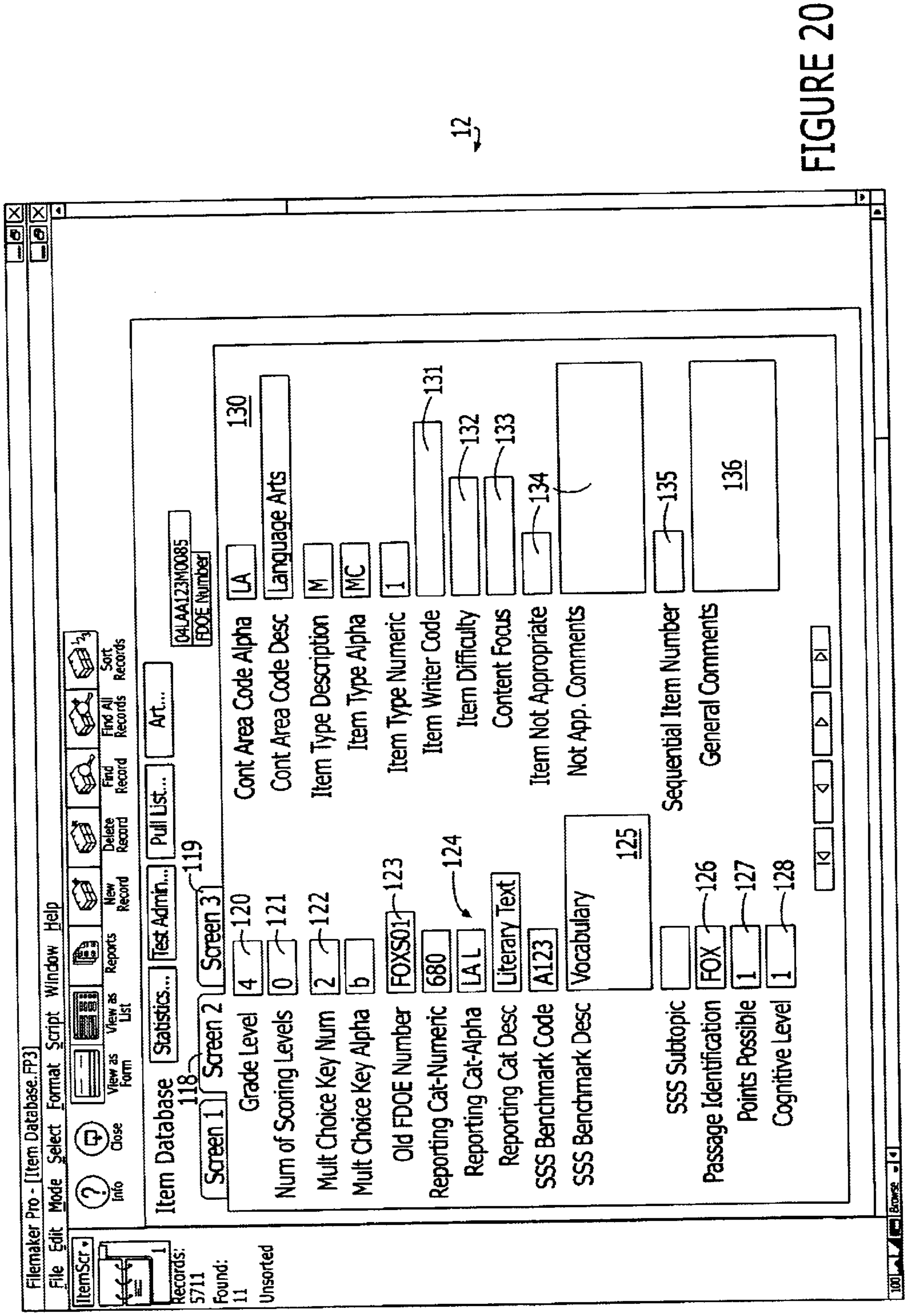
FIG. 20 is a second exemplary item database screen for the first embodiment.
Figure 21:
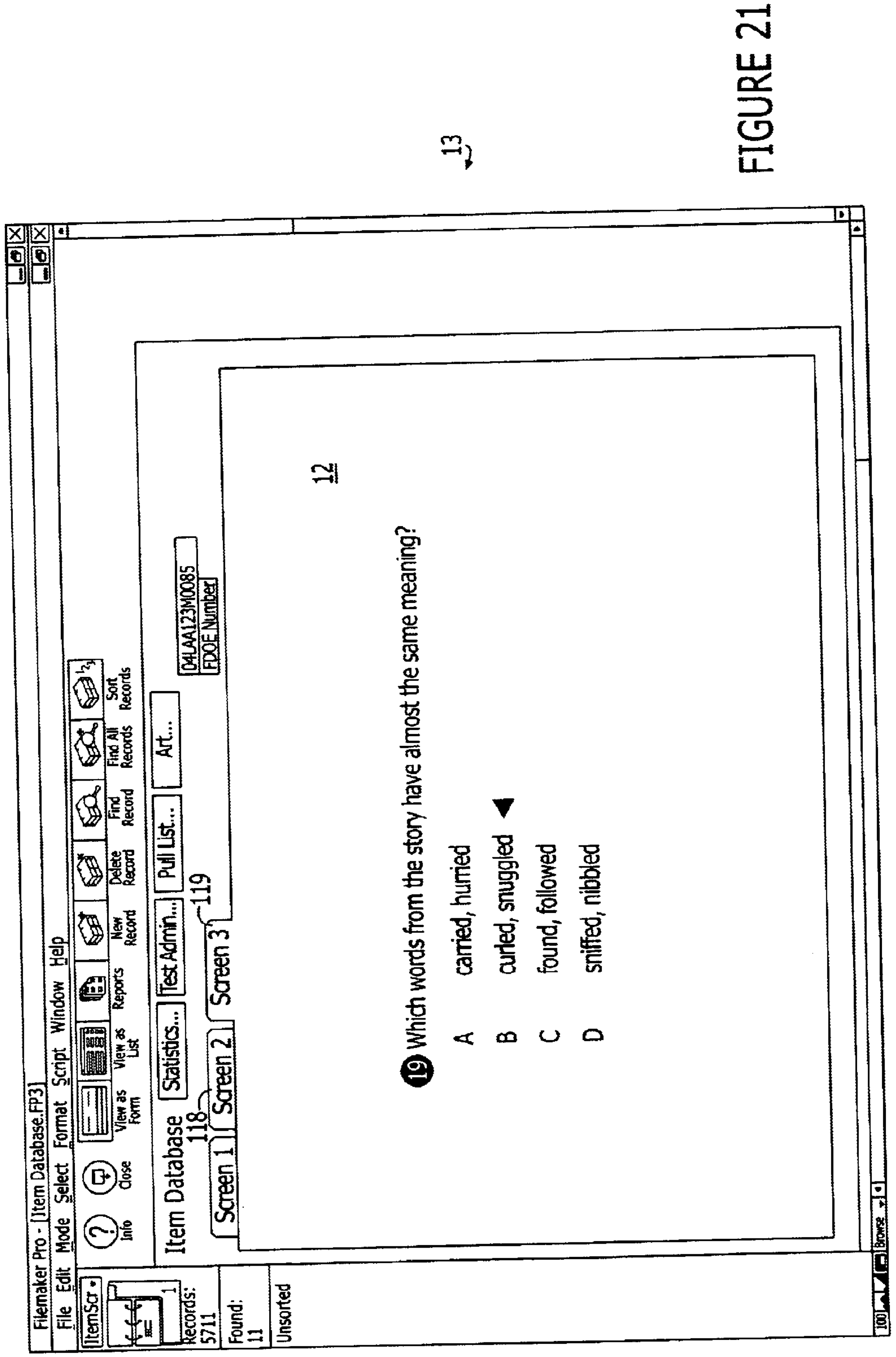
FIG. 21 is a third exemplary item database screen for the first embodiment.
Figure 22:
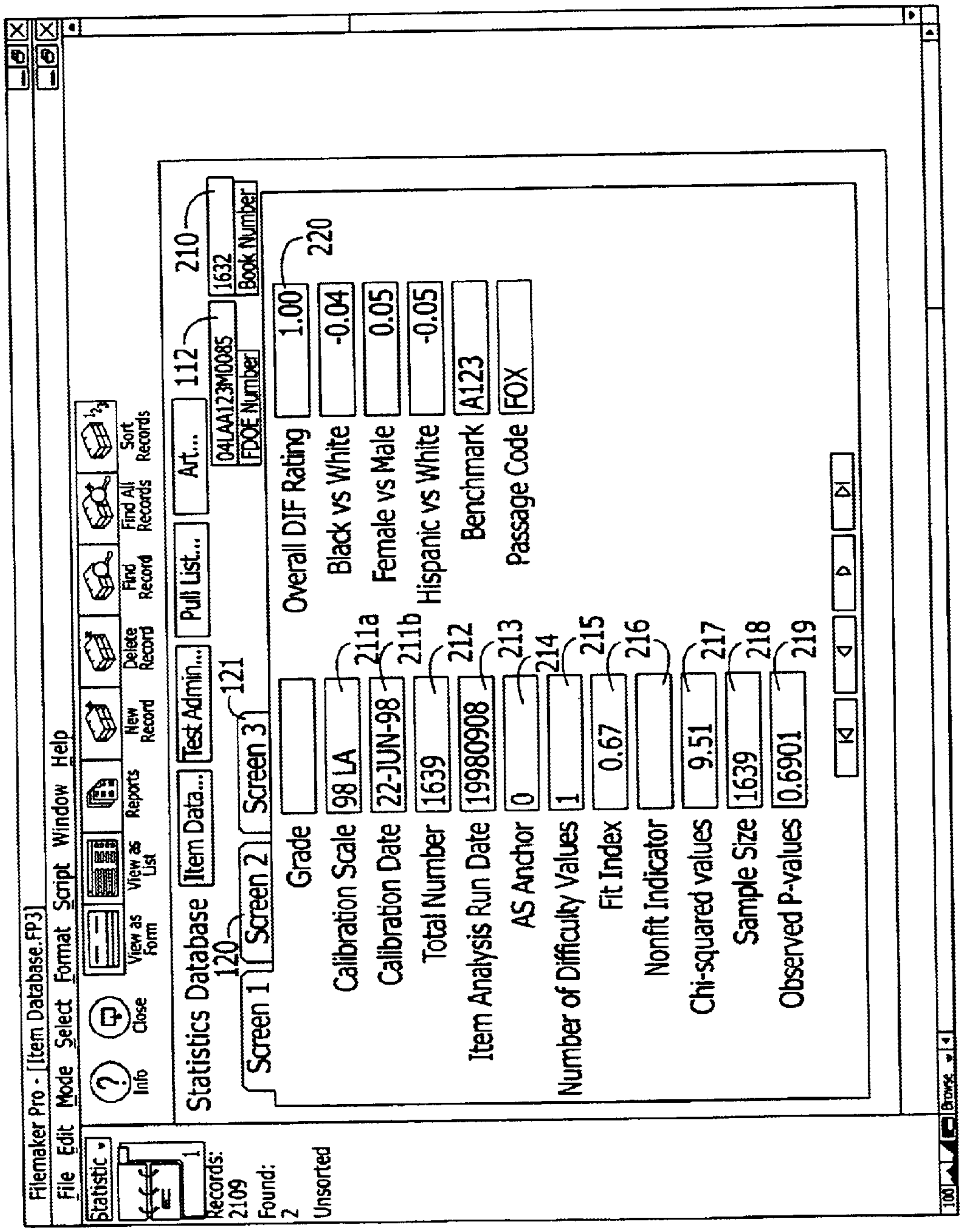
FIG. 22 is a first exemplary statistics database screen for the first embodiment.
Figure 23:
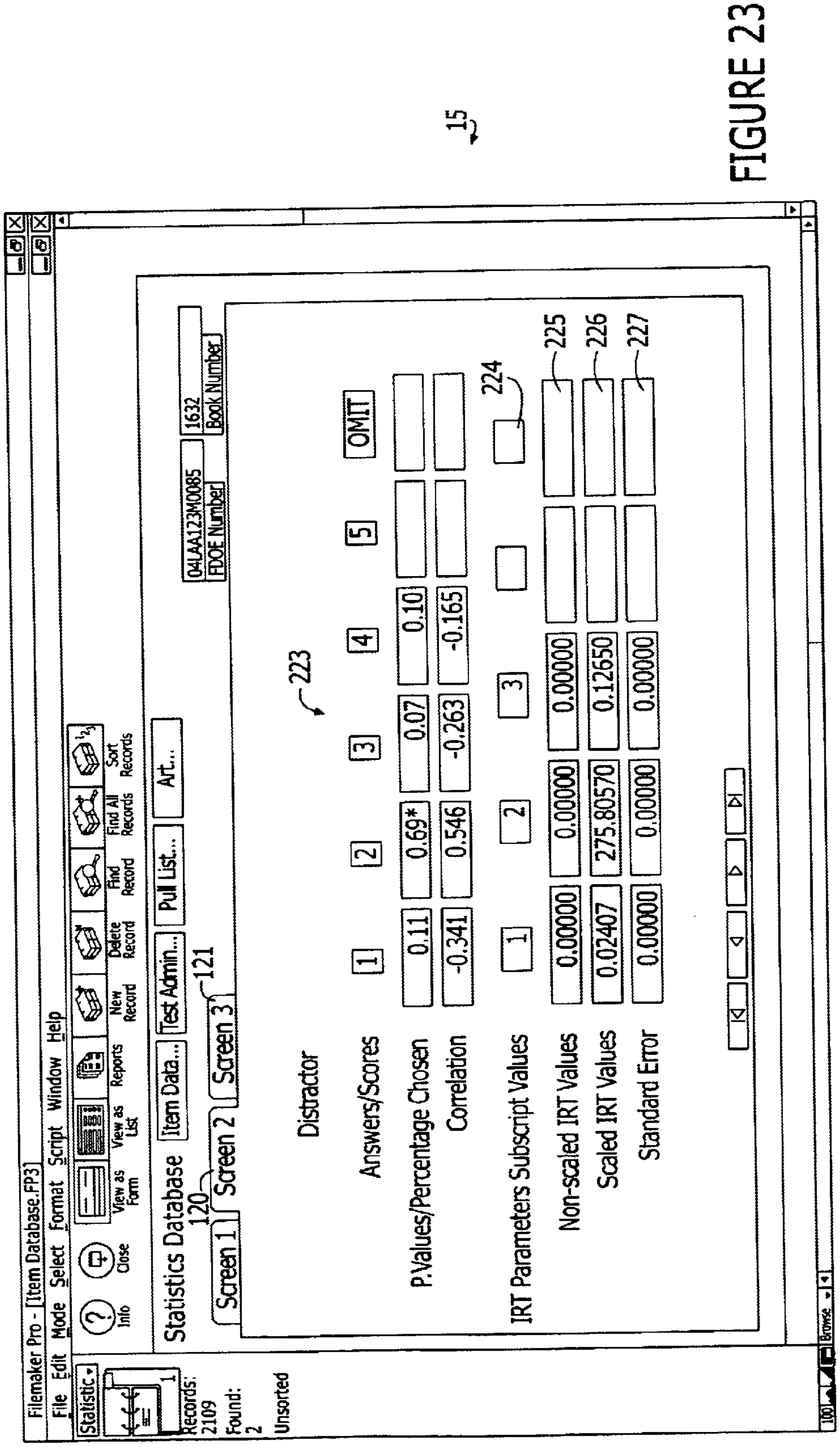
FIG. 23 is a second exemplary statistics database screen for the first embodiment.
Figure 24:
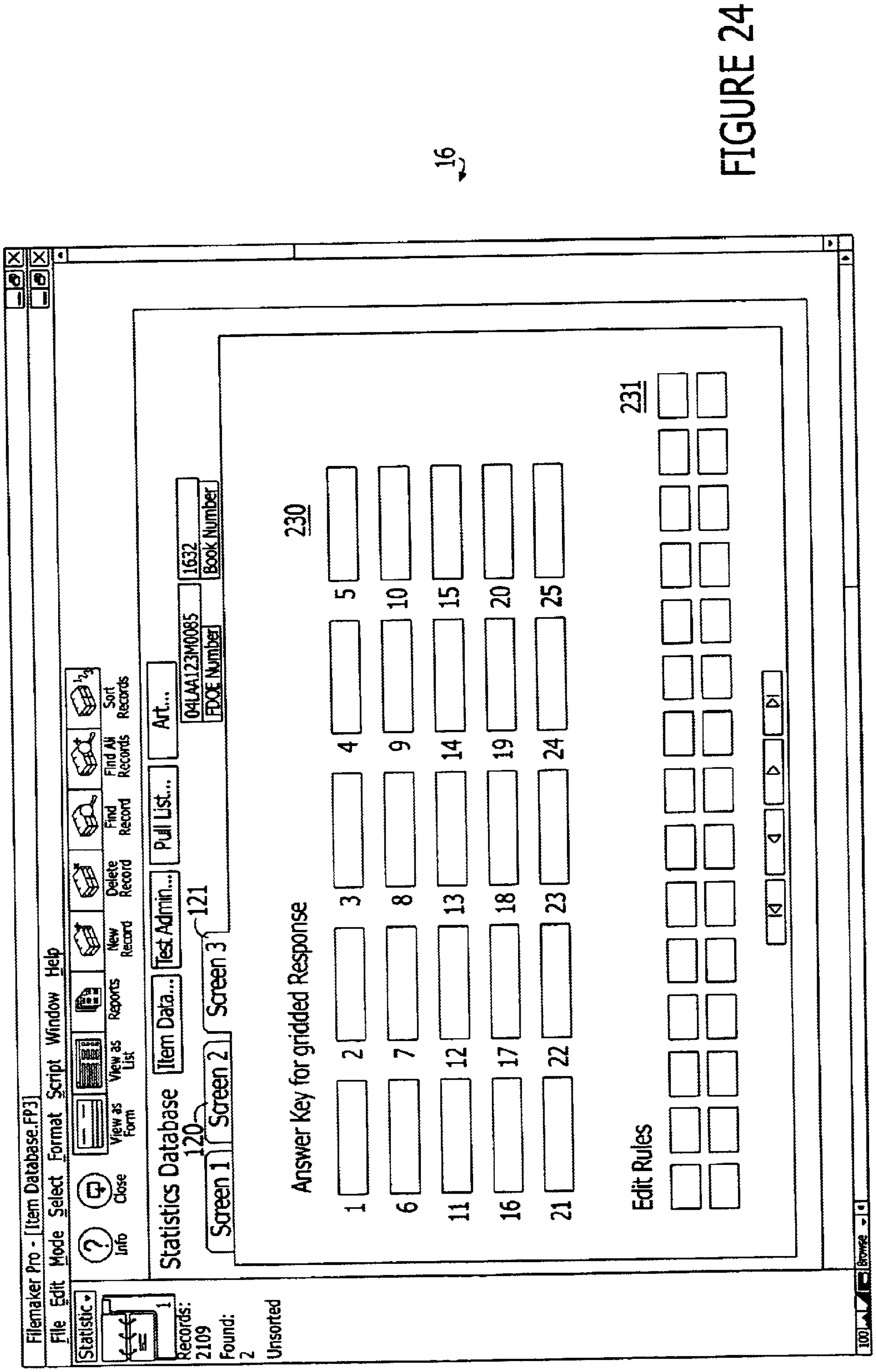
FIG. 24 is a third exemplary statistics database screen for the first embodiment.
Figure 25:
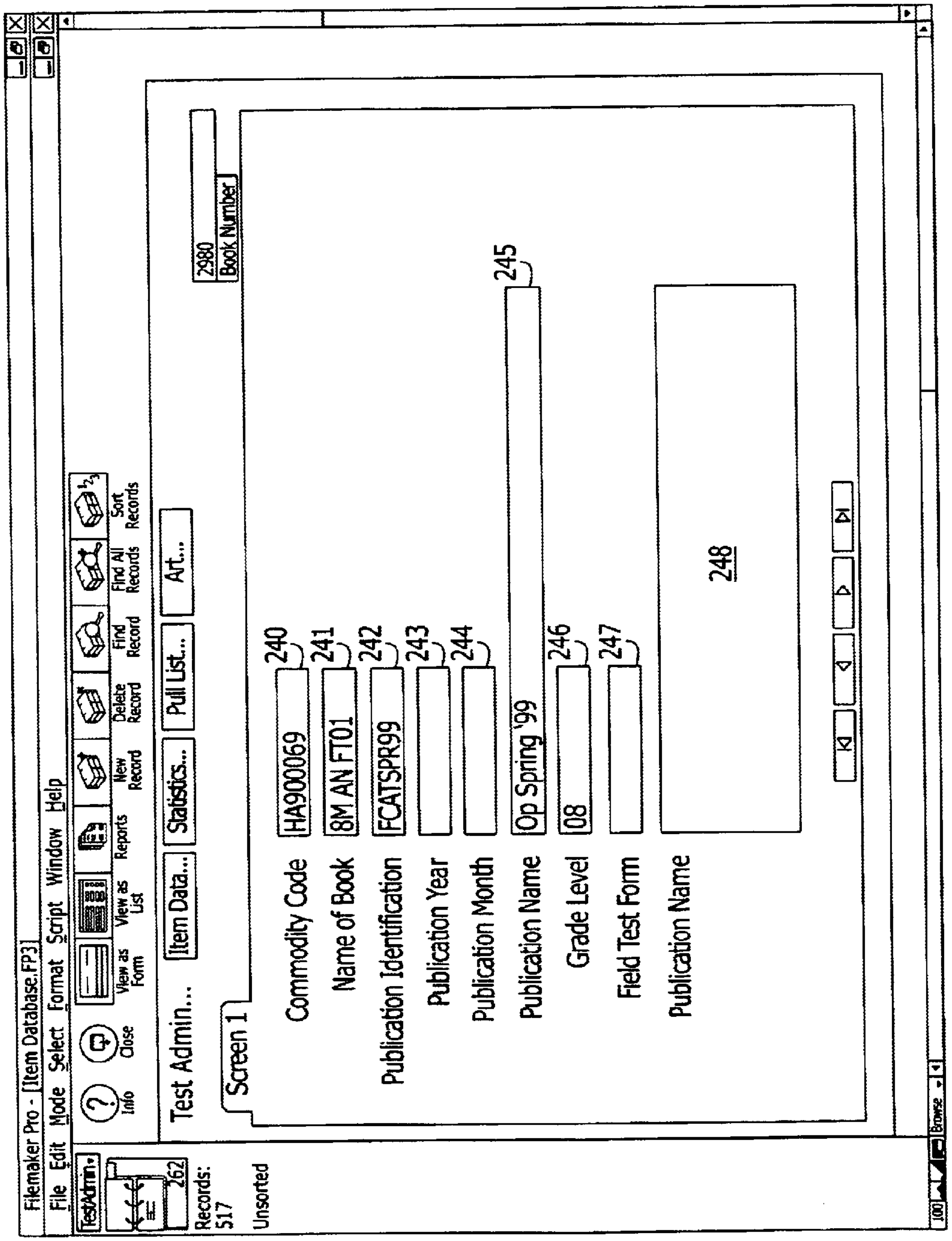
FIG. 25 is an exemplary test administration screen for the first embodiment.
Figure 26:
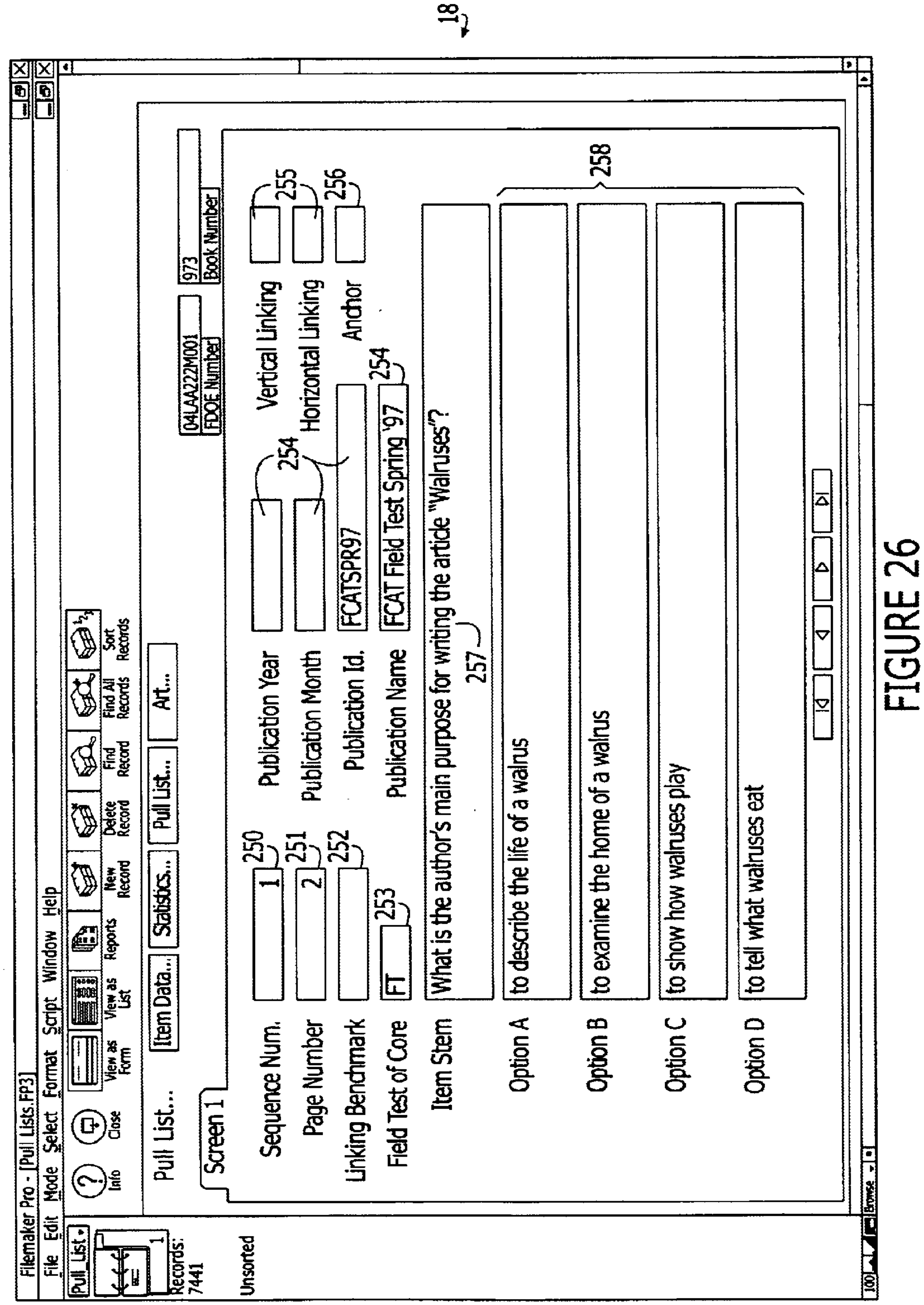
FIG. 26 is an exemplary pull list screen for the first embodiment.
Figure 27:
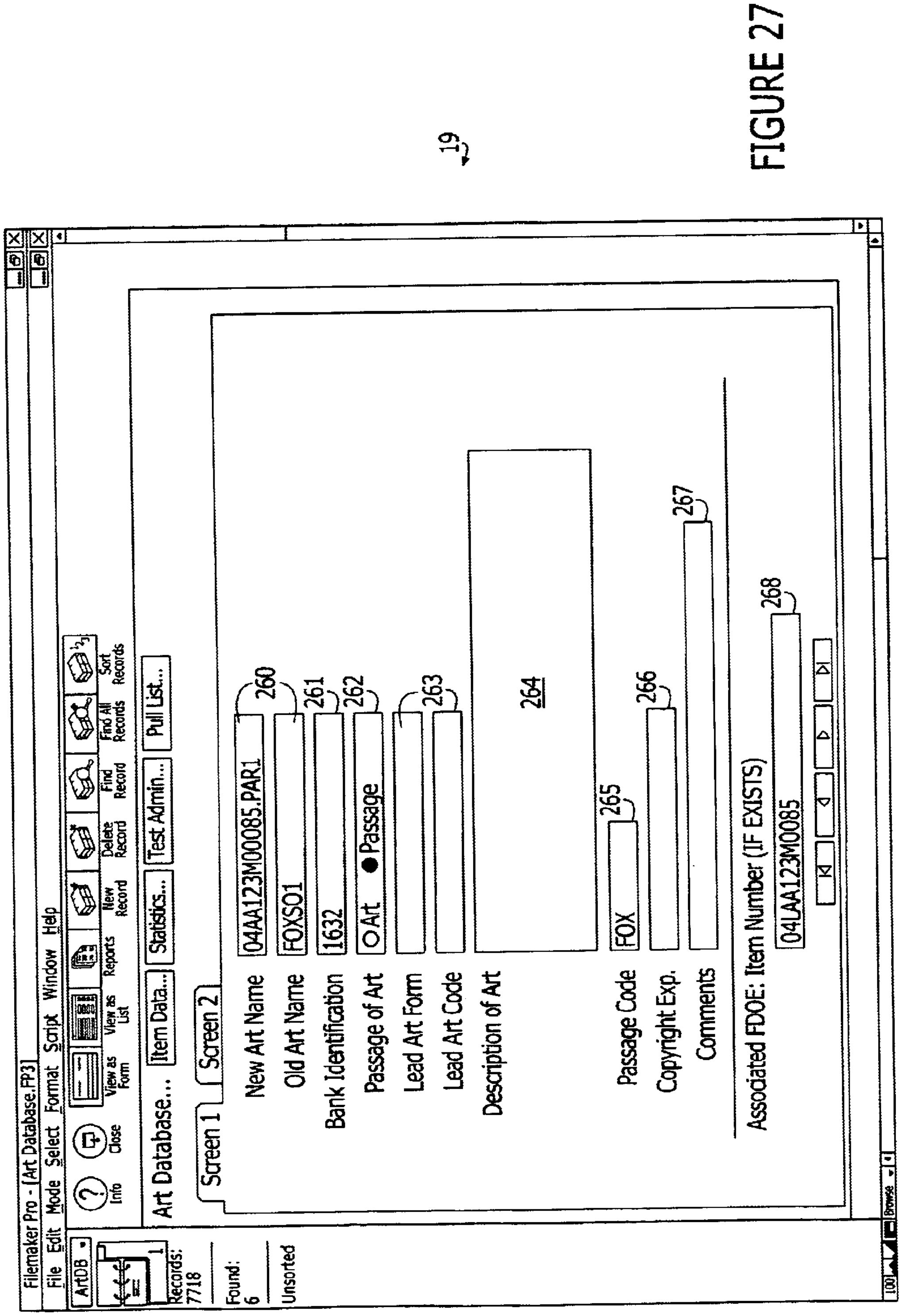
FIG. 27 is a first exemplary art database screen for the first embodiment.
Figure 28:
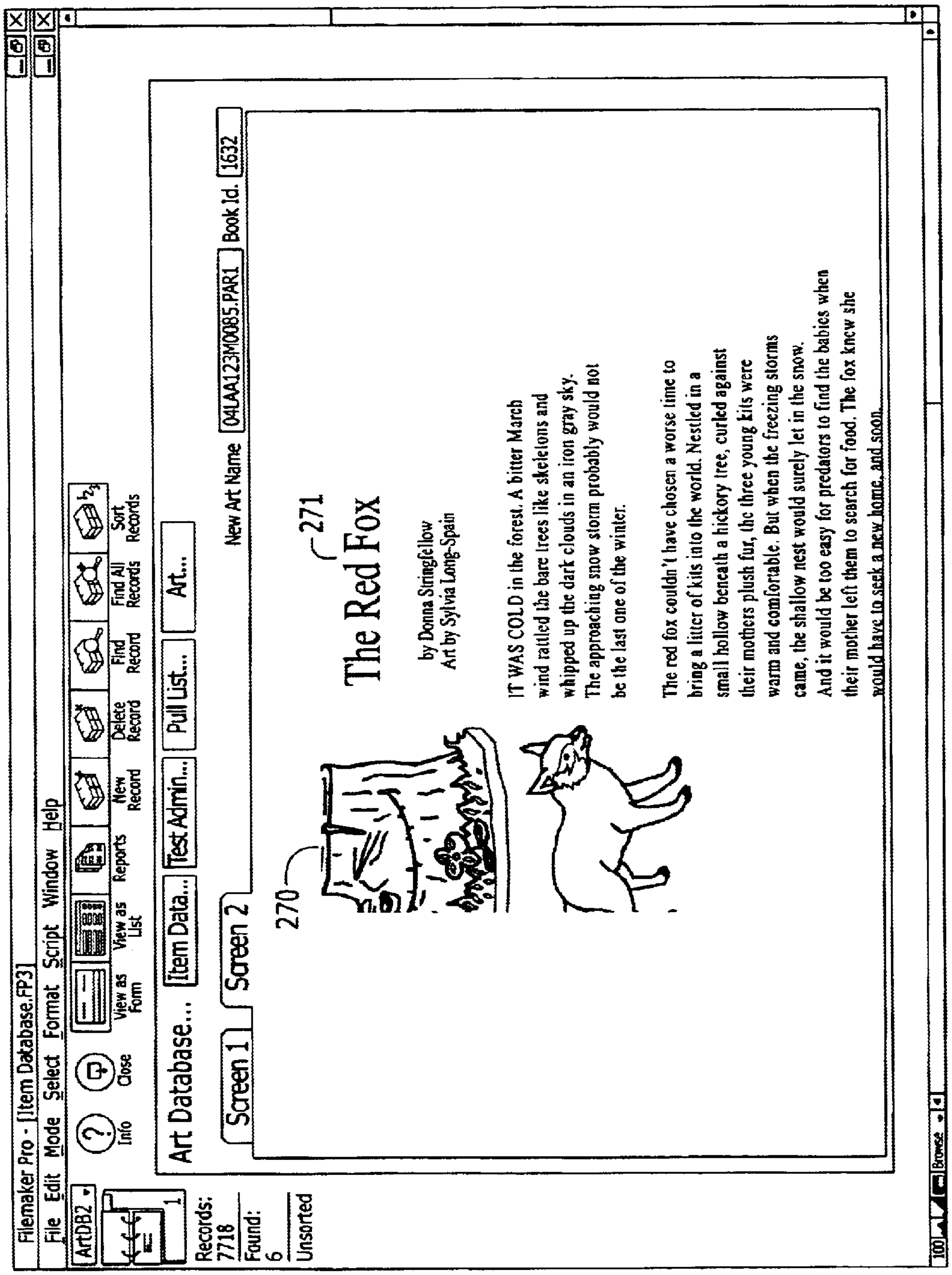
FIG. 28 is a second exemplary art database screen for the first embodiment.
Figure 29:
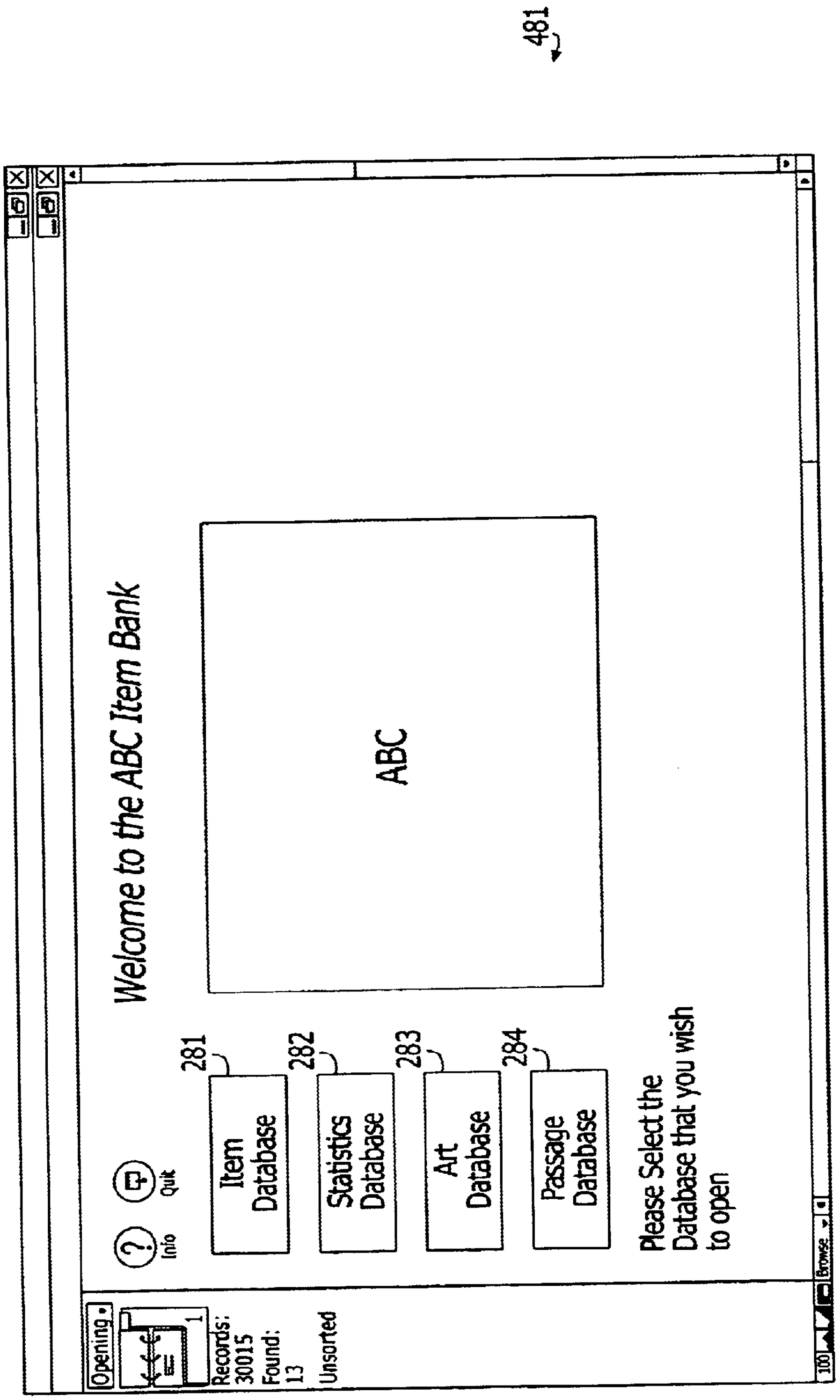
FIG. 29 is an exemplary control screen for the second embodiment.
Figure 30:
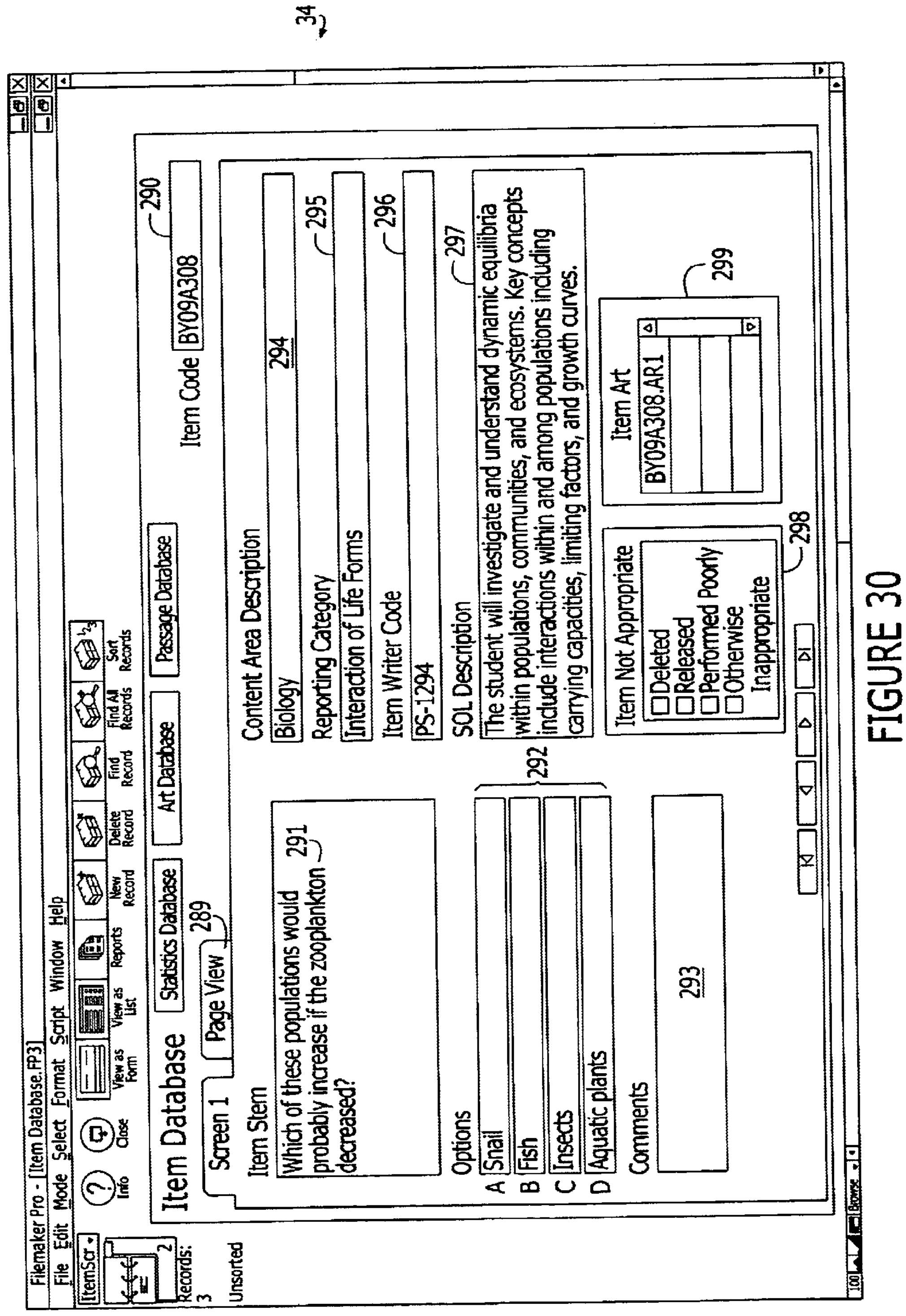
FIG. 30 is a first exemplary item database screen for the second embodiment.
Figure 31:
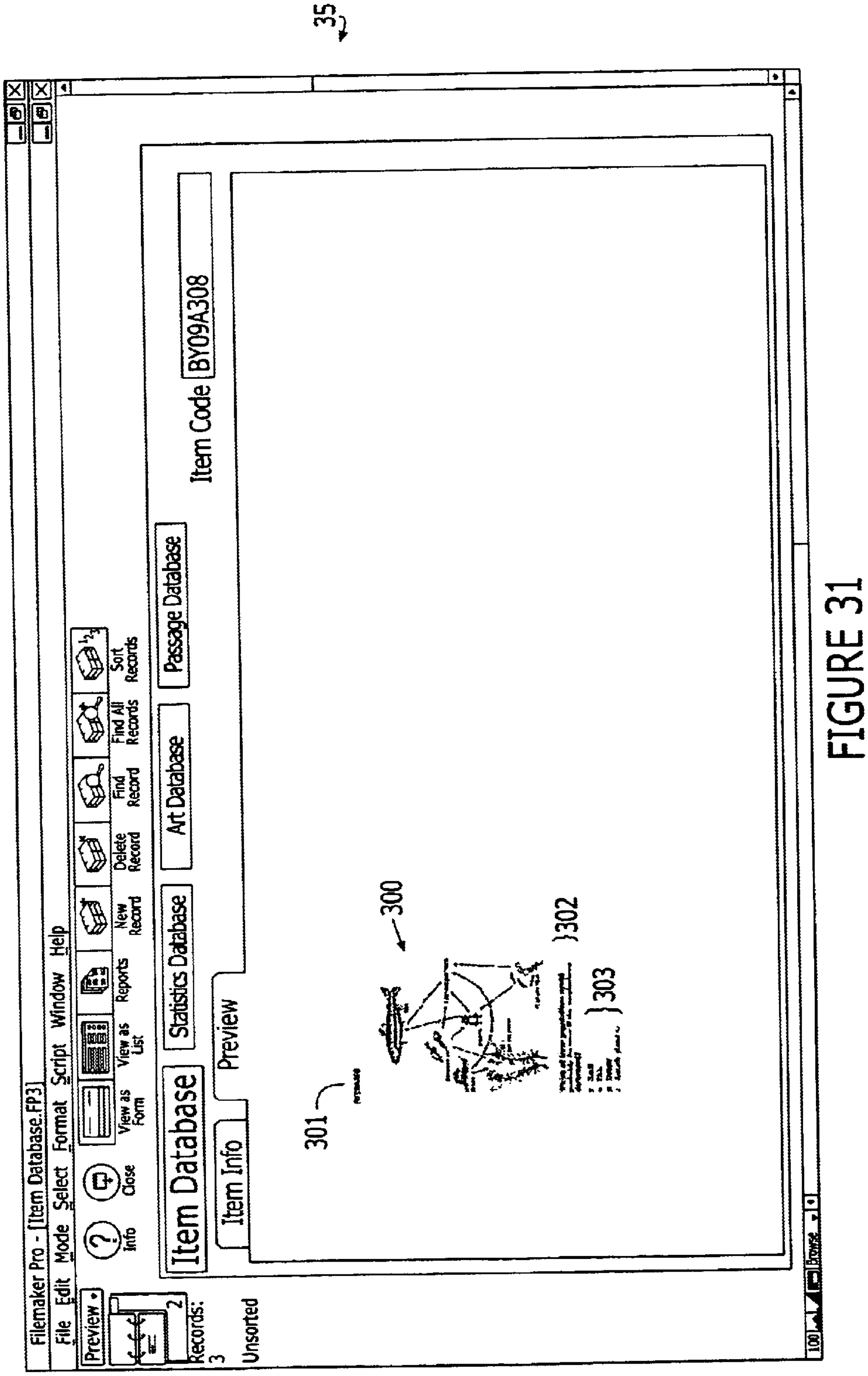
FIG. 31 is a second exemplary item database screen for the second embodiment.
Figure 32:
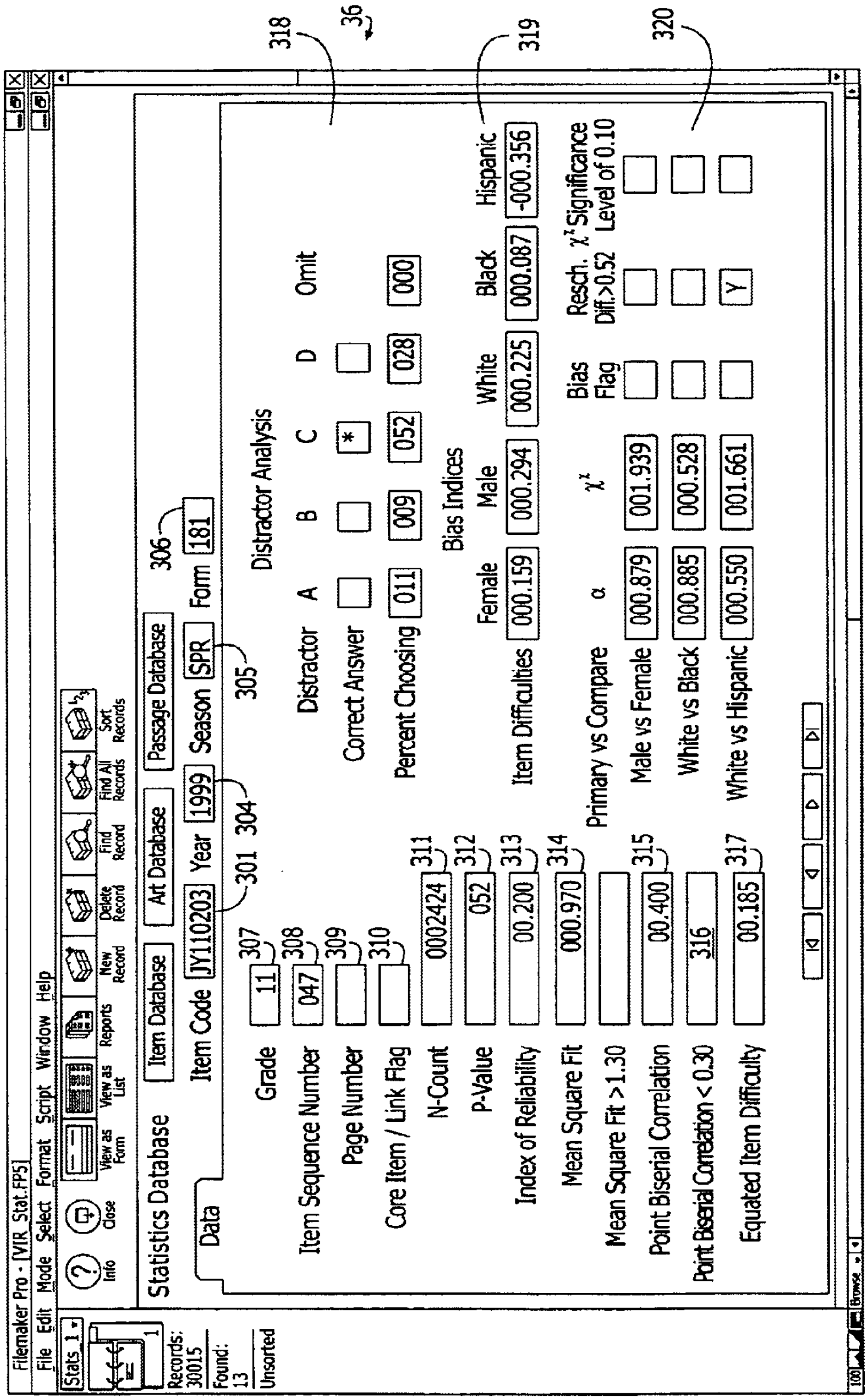
FIG. 32 is an exemplary statistics database screen for the second embodiment.
Figure 33:
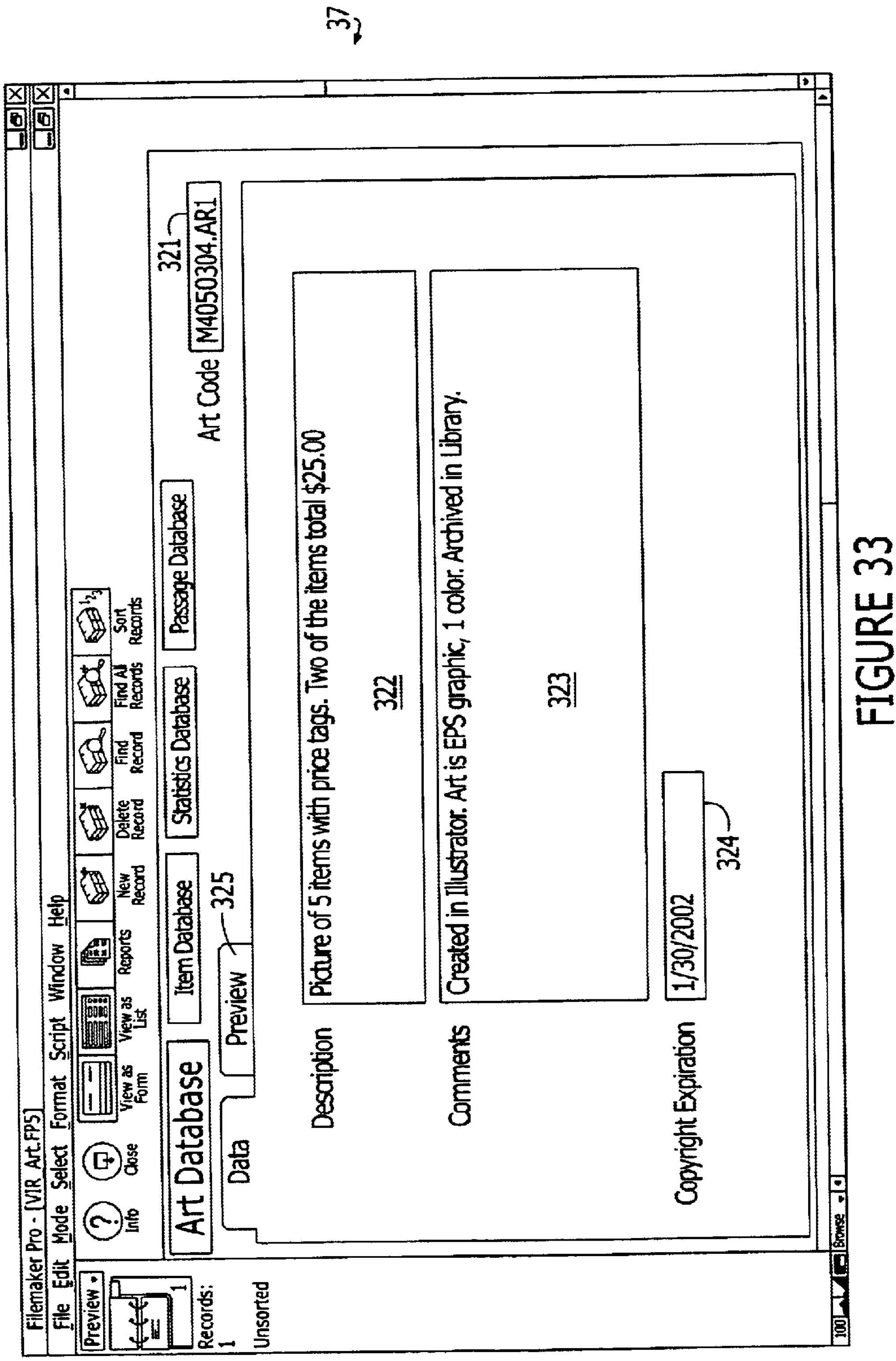
FIG. 33 is a first exemplary art database screen for the second embodiment.
Figure 34:
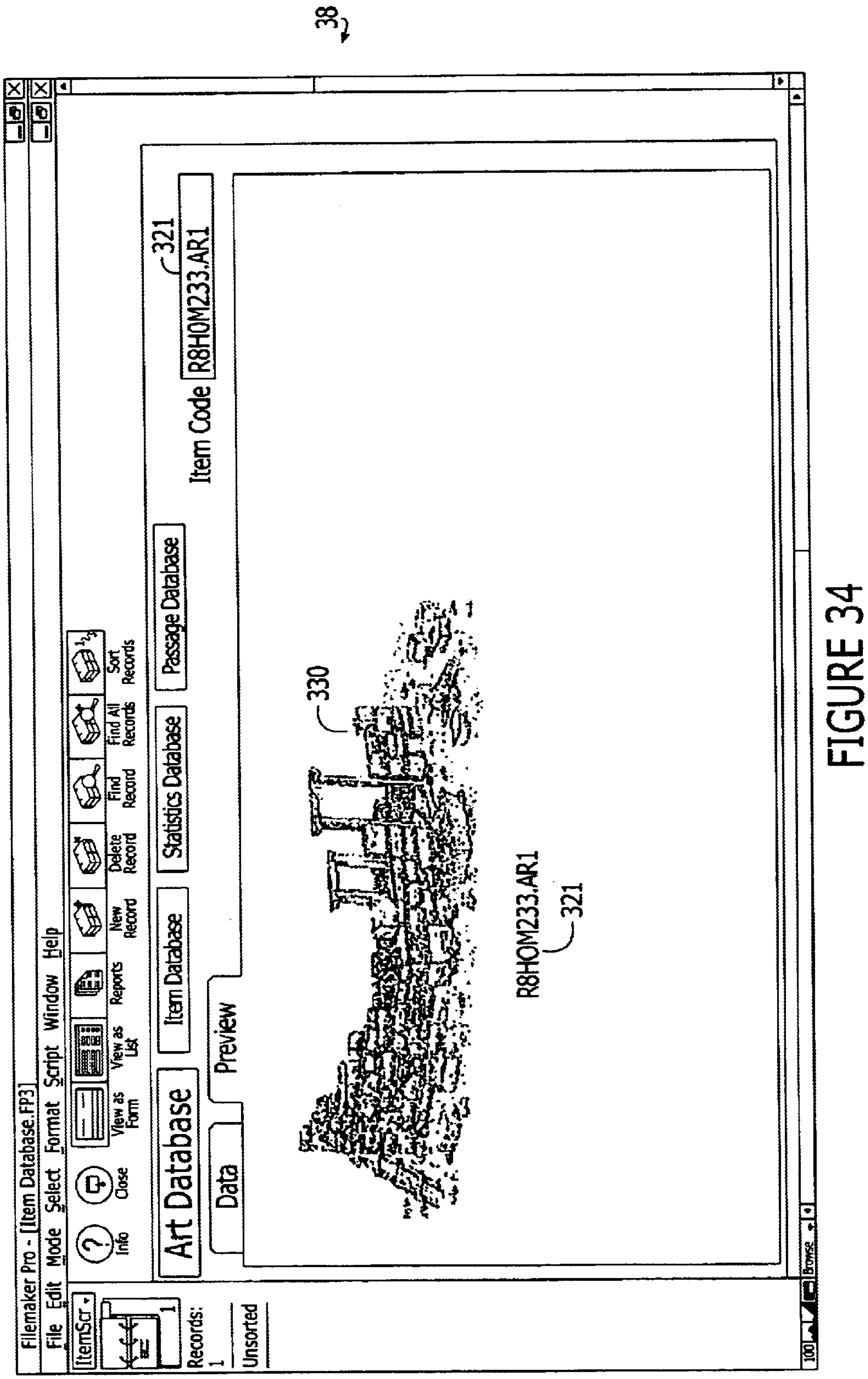
FIG. 34 is a second exemplary art database screen for the second embodiment.
Figure 35:
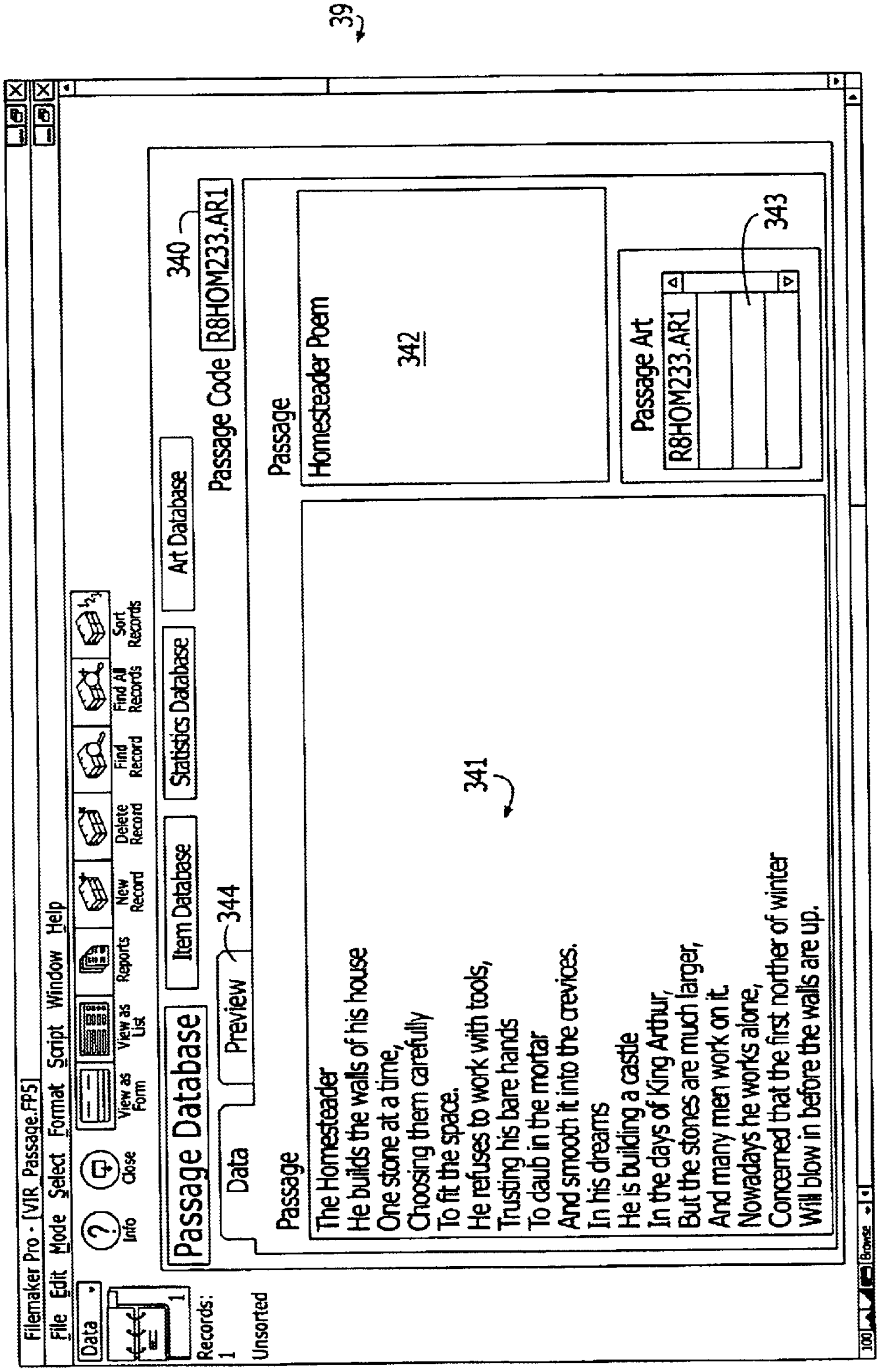
FIG. 35 is a first exemplary passage database screen for the second embodiment.
Figure 36:
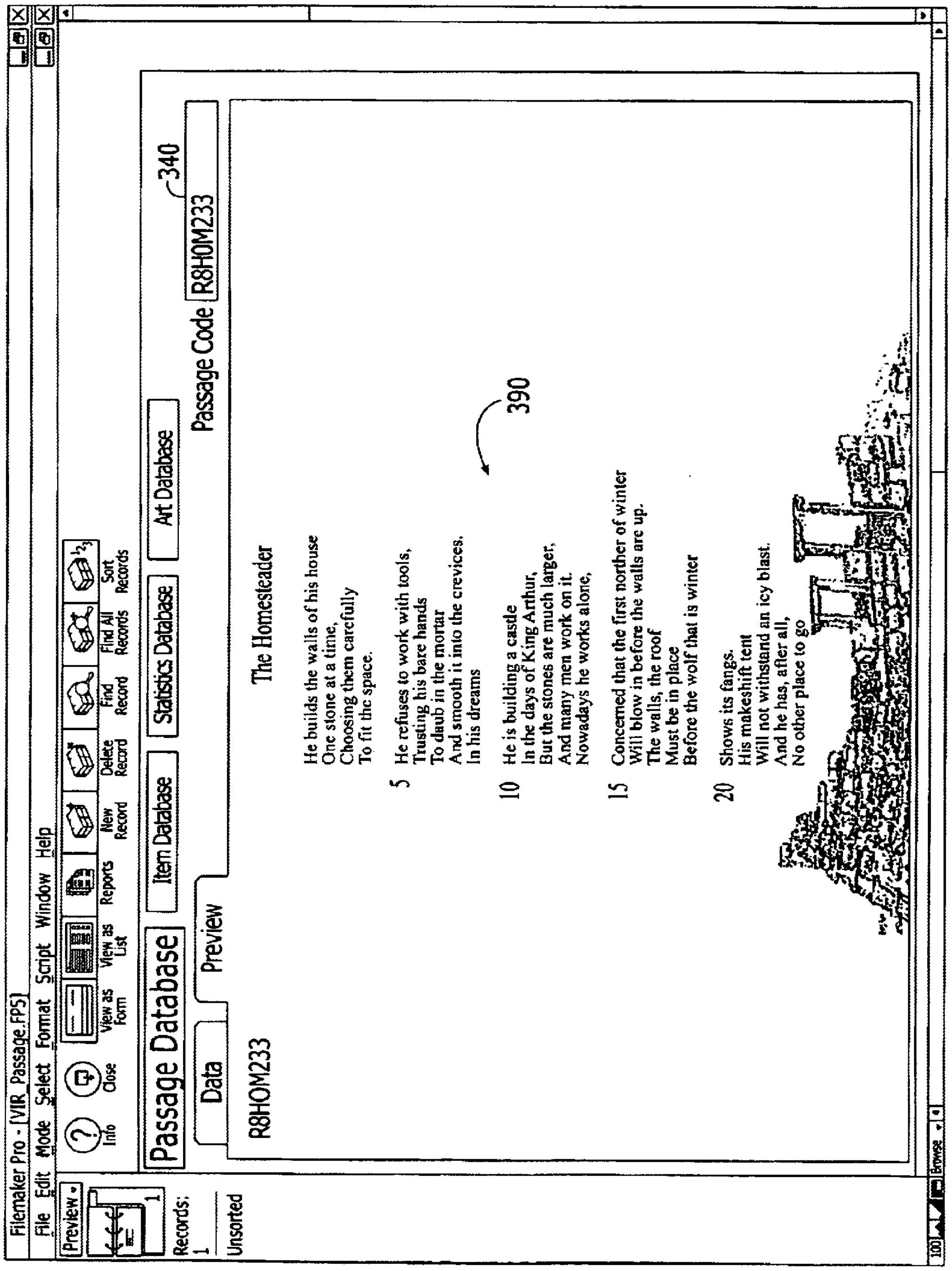
FIG. 36 is a second exemplary passage database screen for the second embodiment.
Figure 37:
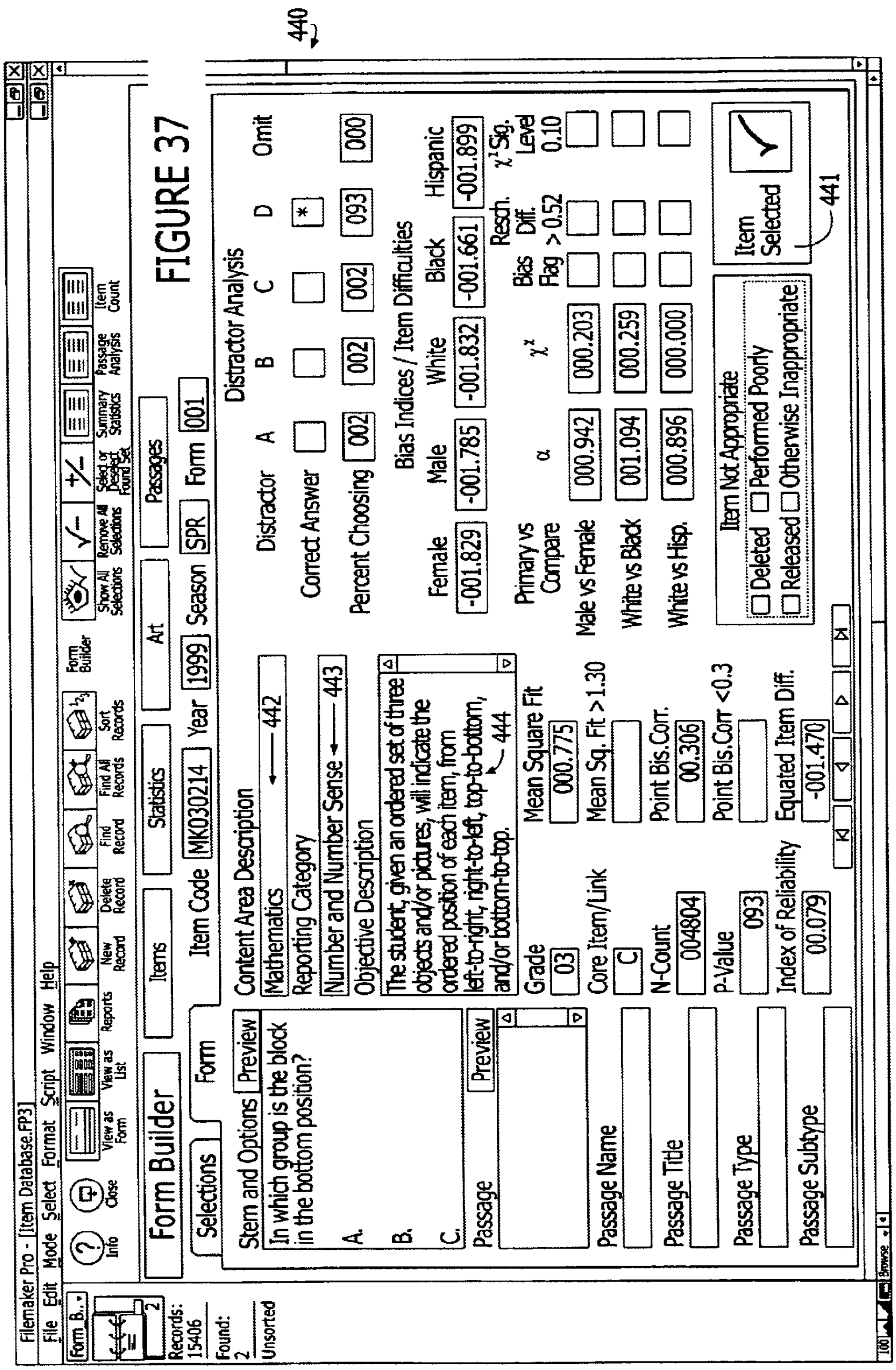
FIG. 37 illustrates the item selection application.

The incorporation of data into the database 23 and the extraction therefrom are illustrated schematically in FIG. 15, wherein exemplary input information comprises input template item information 41, composed pages 42, statistical values 43, copyright information 44, and historical data 45. Subsets of these data include, but are not intended to be limited to:

- Item template item information 41: item type, subject area, reporting category, objectives, item ID code, passage/stimulus name
- Composed pages 42: images of items, group stimulus, test form, number of answer choices, sequence number, history of use
- Statistical values 43: IRT parameters, fit index, chi-squared values, difficulty values, classical item analysis by distractor, bias indices The functional databases, or subdatabases, composing the database 23 are, because of the inherent flexibility of the system 10, configurable to provide a virtually limitless array of interconnections. Two exemplary configurations are shown in FIGS. 16 and 17.

In a first configuration 47 (FIG. 16), the control form 471 presented to a user, from which a selection of functional databases is offered, including, along with their respective contents:

- Item database 472: the item ID, item stem, correct response, distractor(s), benchmark, item type, content area, content focus, text art
- Test administration database 473: administration, book name, commodity code, publication name, grade, form, publication ID
- Pull list database 474: the item ID, administration, page number, sequence number, linking field test/core
- Art/passage database 475: item ID, administration, art name, description of the art, passage code, graphic art
- Statistics database 476: the item ID, administration, P values, bias statistics, scaled values, standard error, correlation, fit index In a second configuration 48 (FIG. 17), the control form 481 presented to a user, from which a selection of functional databases is offered, including, along with their respective contents:

- Item database 482: the item ID, item stem, correct response, distractor(s), benchmark, "item not appropriate indicator," content area, content focus, text art
- Passage database 483: passage code, text art, passage art code
- Art database 484: art code, comments, description of the art, copyright expiration, graphic art
- Statistics database 485: the item ID, administration, P values, bias indices, scaled values, point biserial, item difficulty, mean square fit, grade, item sequence number The item databases 472,482 store the item stem and responses in both textual and graphical form. The text form allows a user to search on the text of a question and associated response(s). The graphical view displays the item as it actually appeared in the test booklet, complete with formatting and artwork. The key for these databases 472,482 is the item ID number.

The statistics databases 476,485 include statistical information developed from raw data accumulated on an administration of a test item. The key for the database 476 of the first embodiment 47 comprises a combination of the item ID number and the test book ID, which serves as a description of the test administration. The key for the database 485 of the second embodiment 48 comprises a combination of the form number, season, and year of administration.

The test administration database 473 is stored by book ID in the first embodiment 47; the data stored herein are included in the statistics database 485 in the second embodiment 48.

The pull list database 474 in the first embodiment 47 contains information describing the role played by the item in an administration (core, field test, linking) and its location within the test book (page and sequence number). These data are included in the statistics database 485 in the second embodiment 48.

The art and passages databases 475,484,483 contain those elements associated with the item. In the second embodiment 48, there are two separate databases, with the text in one 483 and the graphical representations in another 484.

Exemplary screens for the first embodiment 47 are shown in FIGS. 18–28, with the control screen 471 having buttons for selecting subsequent screens as schematically illustrated in FIG. 16. A selection of the "item database" button 101 brings up the first of three accessible screens. Screen 111 (FIG. 19) contains a subscreen that includes the item ID number 112, passage title 113, topic 114; item stem 115, response options 116, and linked passages/art 117.

Screen 212 (FIG. 20), accessible by selecting tab 118 on screen 111 or screen 313, contains information on the grade level 120; number of scoring levels 121; multiple choice key number and key alpha 122; a previous ID number if applicable 123; a reporting category numeric, alpha, and description 124; a project-related benchmark code, description, and subtopic 125; passage identification 126; possible points 127; and cognitive level 128 on the left-hand side. The right-hand side contains content area code alphabetical and description 129; item type description, alpha, and numeric 130; item writer's code 131; item difficulty 132; content focus 133; item not appropriate information and comments 134; sequential item number 135; and general comments 136.

Screen 313 (FIG. 21), accessible by selecting tab 119 on screen 111 or screen 212, shows the item 12 as it will actually appear or actually appeared already in a test booklet.

A selection of the "statistics database" button 102 brings up the first of three accessible screens. Screen 114 (FIG. 22) contains a subscreen that includes the item ID number 112 and book number 210; calibration scale 211*a* and date 211*b*; total number 212; item analysis run date 213; AS anchor 214; number of difficulty values 215, fit index and nonfit indicator 216; chi-squared values 217, sample size 218; and observed P value 219 on the left-hand side. On the right-hand side are located overall differential item functioning rating 220; demographic statistics 221; and passage code 222.

Screen 215 (FIG. 23), accessible by selecting tab 120 on screen 114 or on screen 316, contains information on the distractor(s) 223, including answers/scores, P values/percentage chosen, and correlation; IRT parameter subscript values 224; nonscaled IRT values 225; scaled IRT values 226; and standard error 227. Screen 316 (FIG. 24), which is accessible by depressing button 121 on screen 114 or screen 215, shows an answer key for gridded responses 230 and edit rules 231.

A selection of the "test administration database" button 103 brings up a screen 17 (FIG. 25), which includes commodity code 240; name of book 241; publication identification information 242, year 243, month 244, and name 245; grade level 246; field test form 247; and description 248.

A selection of the "pull list database" button 104 brings up a screen 18 (FIG. 26), which includes sequence number 250; page number 251; linking benchmark 252; field test or core 253; publication identification information 254, including year, month, ID, and name; vertical and horizontal linking 255; anchor 256; item stem 257; and option(s) 258.

A selection of the "art database" button 105 brings up the first of two accessible screens. Screen 119 (FIG. 27) contains a subscreen that includes new and old art names 260, book identification 261, passage or art 262, lead art form and code 263, description of art 264, passage code 265, copyright expiration date 266, comments 267, and associated art number 268.

Screen 233 (FIG. 28) illustrates the item as it will appear in final form, including artwork 270 and formatting elements such as a larger type size for the title 271.

It should also be noted that the initial database screens 11, 14, 17–19,33 are also accessible from all other screens 11–19,33; that is, one does not need to return to the control screen 471 to reach alternate database screens. This selection may be made by selecting a button along the top of each subscreen.

Exemplary screens for the second embodiment 48 are shown in FIGS. 29–36, with the control screen 481 having buttons for selecting subsequent screens as schematically illustrated in FIG. 17. A selection of the "item database" button 281 brings up the first of two accessible screens. Screen 134 (FIG. 30) contains item information, including the item code 290, item stem 291, option(s) 292, comments 293, content area description 294, reporting category 295, item writer's code 296, SOL description 297, an "item not appropriate" list 298, and item art list 299.

Screen 2 35 (FIG. 31), accessible by selecting tab 289 on screen 134, displays a representation of the item as it will appear in a test, including artwork 300, item code 301, item stem 302, and options 303.

Selecting the "statistics database" button 282 on screen 481 brings up screen 36 (FIG. 32), which displays item code 301, year 304, season 305, and form number 306. The subscreen displays grade 307, item sequence number 308, page number in the test book 309, a core item/link flag 310, N count 311, P value 312, index of reliability 313, mean square fit 314, point biserial correlation 315, point biserial correlation <0.30316, equated item difficulty 317, distractor analysis 318, bias indices 319, and prior versus compare data 320.

Selecting the "art database" button 283 on screen 481 brings up a first screen 37 (FIG. 33), which displays data including art code 321, a description of the art 322, comments on the art 323, and the copyright expiration 324.

Screen 238 of the art database (FIG. 34), accessible by selecting button 325 on screen 137, includes a representation of the art 330 as it will appear on a page, along with the art code 321.

Selecting the "passage database" button 284 on screen 481 brings up a first screen 39 (FIG. 35), which displays data including the passage code 340, the passage in text form 341, comments on the passage 342, and a list of the associated passage art 343.

Screen 2 41 of the passage database, accessible by selecting button 344 on screen 139, includes a representation of the item 390 as it will appear on a page, along with the passage code 340.

As with the first embodiment, the initial database screens 34,37,39 are also accessible from all other screens 34–39,41; that is, one does not need to return to the control screen 481 to reach alternate database screens, but may make a selection by selecting a button along the top of each subscreen.

These two embodiments are intended to be exemplary, and one of skill in the art will recognize the inherent flexibility of the system and its adaptability to a wide range of applications. Further, as with the test item creation application above, it may be contemplated that this application is easily amenable to content delivery in any electronic format and having interaction capabilities over, for example, the Internet. Also as above, interaction with this application may be envisioned as occurring via queries to the user rather than via Windows®-type screens.

Item Selection Application

The item selection application 50 of the present invention (FIG. 37) assists the user to assemble a test 90 from created items. It is known in the art that selecting items for inclusion in a test is both analytical and subjective. In prior art paper-based systems, item cards were arranged by some criterion, such as grade or content area. Further sorting resulted in piles based upon, for example, a range of P values or Rasch scores. The subjective phase of the selection then included reading and reviewing item stems and responses along with artwork, choosing appropriate items, sequencing those chosen items, and, if desired, readjusting with refinement on such considerations as target statistics.

In the present invention, the database 23 may be queried on one or more criteria simultaneously in a matter of seconds by viewing screen 440. The user can examine each resulting item in text or graphical form and select items believed desirable for inclusion in a test. Included on the screen 440 are statistical data for that item, content area description 442, reporting category 443, and an objective description of the item 444. The item, if desired, is then placed in a "shopping cart" by selecting button 441, not unlike those used in online shopping, or into an "item working set."

Another important feature of the present invention is the ability to perform a calculation on the shopping cart contents to yield high, low, mean, and standard deviations on the statistics, such as, but not limited to, P values and Rasch scores for the pool of items in the cart. If calculated values fall outside a predetermined desired range, at least one item can be removed from the cart and replaced with another item from the database 23. Once a desired range is found, the items can be sequenced.

Another feature of the item selection application 50 includes the ability to generate reports, such as pull lists, test defines, and forms, which makes it possible to develop forms in parallel fashion, in, if desired, a plurality of versions, yet another advantage of the present system 10.

A further link to sophisticated curve-fitting statistical software, such as SAS or Multi-log, although these are not intended as limitations, permits the user to generate and draw complex functions. Such software may access, for example, historical data to derive a test characteristic curve representative of the appearance of a desirable item pool.

Next prospective items are grouped, sample statistics are run, and a function is plotted. If the curve overlies the baseline curve, the pool is a possible solution for a test form. If the curve differs significantly, at least one item may be removed from the pool and a new item selected based upon a tendency to move the function closer to the baseline curve.

Test Item Assembly Application

The test item assembly application 60 of the present invention (FIG. 38) comprises moving the selected test items to a medium preparatory to creating an actual test form 90. This process includes typesetting or "tagging" for publication software, such as Xyvision® Production Publisher or Quark Xpress™ and embedding required graphics, tables, and artwork; Text formatting can applied as desired, such as including boldface, italic, or underlined type and one- or two-column format, for example. A form may then be output to a device such as a printer; alternatively, a form or portion thereof may be printed directly. In addition, the output may be contemplated as occurring electronically for printing elsewhere; alternatively, the output may remain in electronic form for enabling online testing, with hard-copy output not necessary.

The database system may or may not be linked to this application. If the database system is used to store the "tagging" information, it also serves as the front end to the publishing software. An advantage of this option is the avoidance of rekeying. In addition, items that are not part of the database cannot appear in the test 90. Also, since the database drives the production process, that which is in the database and that which goes to press must be identical.

In the screen 445 of FIG. 38, a list of the selected items is presented, along with choices of buttons 446 for performing desired calculations or presenting alternate views. This list permits the user to scan for statistics, bunching of correct answer letters 447, and the selected items 448.

It may be appreciated by one skilled in the art that additional embodiments may be contemplated, including similar relational database functionalities.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for creating a test for administration to a student comprising the steps of:

creating a plurality of test items using unitary software means, each test item having a plurality of elements comprising an item stem, a response option, and metadata related to the test item;

if desired, adding to at least one test item an image using the software means;

storing each test item in an electronic database;

providing access to each test item in the database, the test items searchable by at least one of the test item elements; and electronically selecting at least one test item from the database;

viewing at least a portion of the selected test item;

if desired, assembling the at least one selected test item into a test;

plotting a test characteristic curve representative of an appearance of a desirable item pool:

calculating a statistical function from metadata corresponding to all test items in the assembled test;

plotting the statistical function;

if the statistical function is sufficiently close to the test characteristic curve, accepting the assembled test; and if the statistical function is not sufficiently close to the test characteristic curve, removing a test item from the assembled test and replacing the removed test item with another test item tending to bring the statistical function sufficiently close to the test characteristic curve.

2. The method recited in claim 1, wherein the metadata further comprise at least one of statistics and occurrence data on prior administration of each test item, subject area, item type, reporting category, item identifier, and an objective.

3. The method recited in claim 1, wherein the electronic database comprises a plurality of subdatabases, including at least one of an item database, a test administration database, an art database, a passage database, and a statistics database.

4. The method recited in claim 3, wherein the access-providing step comprises permitting a user to select a desired subdatabase for viewing a selected element thereof.

5. The method recited in claim 4, wherein the permitting step comprises accessing a database software means via a custom interface comprising user-activatable selection means using an input device in electronic communication with a processor in accessing communication with the database.

6. The method recited in claim 1, wherein the metadata comprise statistical information on a prior administration of the test item, the statistical information in assisting a user in selecting a test item for inclusion into a test.

7. The method recited in claim 1, wherein the viewing step comprises the steps of:

selecting a type of view desired from an unformatted textual representation without associated graphics and a formatted representation including associated graphics and textual formatting elements; and presenting the desired type of view to a user.

8. The method recited in claim 1, wherein the selecting step comprises:

electronically searching the database using at least one of the metadata elements as a search criterion;

if the searching step yields at least one test item, viewing at least a portion of at least one of the test items; and if desired, electronically adding a link to a selected test item to an electronic record comprising data for forming the test.

9. The method recited in claim 8, further comprising the steps of:

performing a calculation on a statistical datum of all selected test items forming the test to yield a statistical value;

if the statistical value falls within the predetermined range, accepting the formed test;

if the statistical value falls outside the predetermined range, removing at least one test item from the test and replacing the removed test item with another test item tending to bring the statistical value within the predetermined range; and if necessary, repeating the performing and removing steps until the statistical value falls within the predetermined range.

10. The method recited in claim 1, further comprising the steps of:

electronically searching the database using at least one of the metadata elements as a search criterion; and outputting results of the searching step.

11. A system for creating a test for administration to a student comprising:

a processor having database software means resident thereon;

an electronic database accessible by the processor and adapted to receive for storage therein a plurality of graphical images and a plurality of test items, each test item having a plurality of elements comprising an item stem, a response option, metadata related to the test item, and, if desired, a link to at least one of the graphical images;

input means in electronic communication with the processor, adapted to provide access to each test item in the database, the test items searchable by at least one of the test item elements with the use of the database software means, the input means further adapted to permit an electronic selection of at least one test item from the database; and output means in electronic communication with the processor adapted to display at least a portion of the selected test item;

the input means further adapted to receive an instruction to link the selected test item with a test for assembly therewith using the database software means, and further comprising a link to a software package that is adapted to:

plot a test characteristic curve representative of an appearance of a desirable item pool;

calculate a statistical function from metadata corresponding to all test items in the assembled test;

plot the statistical function, and wherein the input means is further adapted to;

if the statistical function is sufficiently close to the test characteristic curve, permit a user to accept the assembled test; and if the statistical function is not sufficiently close to the test characteristic curve, permit a user to remove a test item from the assembled test and replace the removed test item with another test item tending to bring the statistical function sufficiently close to the test characteristic curve.

* * * * *